US007450325B2

(12) United States Patent
Yamashita et al.

(10) Patent No.: US 7,450,325 B2
(45) Date of Patent: Nov. 11, 2008

(54) OBJECTIVE-LENS PROTECTOR, OBJECTIVE-LENS TREATMENT METHOD, AND OBJECTIVE-LENS CLEANER

(75) Inventors: Hideto Yamashita, Nagano (JP); Hiroya Fukuyama, Machida (JP); Tadashi Hirata, Hachioji (JP)

(73) Assignee: Olympus Corporation, Tokyo (JP)

( * ) Notice: Subject to any disclaimer, the term of this patent is extended or adjusted under 35 U.S.C. 154(b) by 203 days.

(21) Appl. No.: 11/400,200

(22) Filed: Apr. 10, 2006

(65) Prior Publication Data

US 2006/0250928 A1    Nov. 9, 2006

(30) Foreign Application Priority Data

Apr. 13, 2005  (JP)  ............................. 2005-115565
Apr. 25, 2005  (JP)  ............................. 2005-127139

(51) Int. Cl.
  *G02B 7/02*  (2006.01)
  *G02B 23/16*  (2006.01)
  *G03B 17/00*  (2006.01)

(52) U.S. Cl. ...................... 359/830; 359/819; 359/827; 359/511; 396/530; 353/101

(58) Field of Classification Search ................. 359/811, 359/819, 821, 823, 827, 828, 830, 831, 380–382, 359/656; 396/72, 144, 298, 349, 529, 530, 396/544; 353/100, 101; 348/345, 360
See application file for complete search history.

(56) References Cited

U.S. PATENT DOCUMENTS 4,385,812 A * 5/1983 Wille et al. ................. 359/511
5,053,794 A * 10/1991 Benz .......................... 396/432
5,249,082 A * 9/1993 Newman ..................... 359/813
5,940,228 A * 8/1999 Burnett ....................... 359/825
6,547,402 B2 * 4/2003 Masuda ...................... 353/101
6,788,891 B1 * 9/2004 Mitsugi ...................... 396/144

FOREIGN PATENT DOCUMENTS

EP        1 524 542 A1    4/2005
FR        2 584 829        1/1987
JP        09-203863        8/1997

* cited by examiner

*Primary Examiner*—Loha Ben
(74) *Attorney, Agent, or Firm*—Pillsbury Winthrop Shaw Pittman LLP

(57) ABSTRACT

The present invention makes an objective lens easier to handle during disinfection or sterilization and protects the objective lens during, for example, transport, storage, or handling. The present invention provides an objective-lens protector including a substantially ring-shaped mounting portion surrounding a circumference of an objective lens, the mounting portion detachably mounted on the objective lens such that a threaded mount formed on the objective lens for mounting the objective lens to a microscope main body is exposed; a protecting member fixed to the mounting portion, extending substantially along the entire length of the objective lens mounted on the mounting portion, and arranged at a distance outwardly in a radial direction of the objective lens so as to surround the objective lens; and a locking mechanism provided on the mounting portion to prevent the objective lens from moving relative to the mounting portion in a circumferential direction.

8 Claims, 20 Drawing Sheets

OBJECTIVE-LENS PROTECTOR, OBJECTIVE-LENS TREATMENT METHOD, AND OBJECTIVE-LENS CLEANER

This application relies for priority upon Japanese Patent Application No. 2005-115565, filed Apr. 13, 2005 and Japanese Patent Application No. 2005-127139, filed Apr. 25, 2005, both of which are hereby incorporated by reference.

BACKGROUND OF THE INVENTION

1. Field of the Invention

The present invention relates to objective-lens protectors, objective-lens treatment methods, and objective-lens cleaners.

2. Description of Related Art

For known immersion objective lenses designed to carry out examination with the end surface thereof in contact with liquid such as immersion oil, immersion oil adhering to the lens tip is wiped off using gauze moistened with a small amount of a solution with an ether to alcohol ratio of 7 to 3 or EE-6310 after the examination is finished (refer to, for example, p. 20 of "operating instructions for the BX51/BX52 biological microscope" by Olympus Corporation, June 2000).

On the other hand, in microscope apparatuses designed to perform in-vivo examination of living organisms, the tip of the objective lens needs to be inserted into a living organism. For this reason, not only the end surface but also a large part, including the end portion, of the objective lens needs to be disinfected, sterilized, or cleaned before and after examination is carried out. In this situation, the objective lens is possibly contaminated before being disinfected or sterilized, and it is not desirable to manipulate the objective lens directly by hand. If the objective lens is manipulated directly by hand after being disinfected or sterilized, it might be infected with some bacteria or contaminated with dust from the hand.

Furthermore, for objective lenses having a small-diameter tip to allow living organisms to be examined with minimal invasiveness, the small-diameter tip of the objective lens needs to be protected from external forces when it is transported, stored, disinfected, sterilized, cleaned, handled, etc. because such objective lenses are readily damaged by external forces due to their lower rigidity.

BRIEF SUMMARY OF THE INVENTION

The present invention has been conceived in light of these circumstances, and an object of the present invention is to provide an objective-lens protector and an objective-lens treatment method for allowing the objective lens to be handled more easily during disinfection or sterilization and for also allowing the objective lens to be protected during, for example, transport, storage, and handling.

Another object of the present invention is to provide an objective-lens cleaner with which the objective lens can easily be cleaned and which also protects the objective lens during transport, storage, handling, and the like.

In order to achieve the above-described objects, the present invention provides the following solutions.

A first aspect of the present invention provides an objective-lens protector including a substantially ring-shaped mounting portion surrounding a circumference of an objective lens, the mounting portion being detachably mounted on the objective lens such that a threaded mount formed on the objective lens for mounting the objective lens to a microscope main body is exposed; a protecting member fixed to the mounting portion, extending substantially along the entire length of the objective lens mounted on the mounting portion, and arranged at a distance outwardly in a radial direction of the objective lens so as to surround the objective lens; and a locking mechanism provided on the mounting portion to prevent the objective lens from moving relative to the mounting portion in a circumferential direction.

According to this objective-lens protector, when the substantially ring-shaped mounting portion is mounted on the objective lens, the protecting member fixed to the mounting portion is disposed at a distance outwardly in the radial direction, extending along almost the entire longitudinal length of the objective lens, so as to surround the objective lens. Therefore, even if an external force is applied to the protecting member, the external force is prevented from being transmitted to the objective lens. Because of this, even if the objective lens has a small-diameter tip with low rigidity, the small-diameter tip is protected from breaking due to such an external force.

At this time, the mounting portion and the objective lens are secured by the locking mechanism so as not to move relative to each other in the circumferential direction. As a result, the objective lens can be manipulated by means of the mounting portion and the protecting member, namely, without having to directly touch the objective lens.

In this case, since the mounting portion is attached to the objective lens when the threaded mount to be engaged with the microscope main body is exposed, the objective lens can be removed from the microscope main body without having to directly touch the objective lens by mounting the objective-lens protector on the objective lens being mounted on the microscope main body and then manipulating the locking mechanism to rotate the objective-lens protector about the optical axis. Also when the objective lens is to be mounted on the microscope main body, it is not necessary to directly touch the objective lens. For this reason, it is possible not only to avoid directly touching the objective lens, which may be contaminated by a specimen, after use but also to prevent the objective lens from being contaminated by touching it after it is cleaned through washing, disinfection, or sterilization.

In the above-described aspect, the mounting portion preferably includes a cut-out portion that allows the objective lens to pass therethrough in a radial direction.

By doing so, the objective-lens protector can be mounted on the objective lens or the objective-lens protector mounted on the objective lens can be removed from the objective lens without having to fully lift the objective lens up to the substantially ring-shaped mounting portion in order to pass the tip of the objective lens through the ring of the mounting portion. In short, by guiding the tip of the objective lens in the radial direction via the cut-out portion formed in the mounting portion, the objective-lens protector can be attached and detached even in a small space around the tip of the objective lens mounted on the microscope main body.

Furthermore, in the above-described aspect, the protecting member preferably includes a through-hole extending in a radial direction.

By doing so, not only can the objective lens inside the objective-lens protector be seen from outside, in the radial direction, irrespective of the objective-lens protector being mounted on the objective lens, but also cleaning can be carried out easily via the through-hole. For example, the objective lens can be roughly cleaned before it is disinfected or sterilized by visually checking for the presence of body fluid, blood, or proteins deposited on the objective lens via the through-hole, followed by efficient disinfection or sterilization treatment of the objective lens.

Furthermore, the above-described objective-lens protector preferably further includes a cap screwed onto the threaded mount of the objective lens; and a sealing member configured to seal a gap between the cap and the objective lens around the entire circumference of the gap.

By doing so, when the opening adjacent to the threaded mount of the objective lens is covered with the cap, the objective lens is sealed by the sealing member around the entire circumference thereof. As a result, the objective lens can be immersed as-is in a disinfectant tank or sterilization tank to allow easy disinfection or sterilization treatment.

In the above-described structure, it is preferable that the mounting portion detachably secure the objective lens via the cap screwed onto the threaded mount of the objective lens.

With this structure, when the objective lens is mounted on the objective-lens protector, the entire outer surface except the threaded mount of the objective lens can be exposed. Since the threaded mount is accommodated in the microscope main body during microscope examination and is thus not contaminated, there is little need for disinfecting or sterilizing the threaded mount. For this reason, with the above-described structure, the entire outer surface except the threaded mount of the objective lens can be disinfected or sterilized.

Furthermore, the above-described objective-lens protector may further include a first mounting portion on which the objective lens is directly mounted; and a second mounting portion on which the objective lens is mounted via the cap.

With this structure, by attaching the objective lens mounted on the microscope main body directly to the first mounting portion and then operating the objective-lens protector, the objective lens can be removed from the microscope main body without having to directly touch the objective lens and the cap can be screwed onto the threaded mount to seal the opening. Next, the objective lens is removed from the objective-lens protector by means of the cap and then the objective lens is mounted on the second mounting portion of the objective-lens protector via the cap. By doing so, when the outer surface of the objective lens, except for the threaded mount covered with the cap, is exposed, the objective lens can be mounted on the objective-lens protector so that the entire outer surface of the objective lens can easily be disinfected or sterilized.

A second aspect of the present invention provides an objective-lens treatment method including the steps of mounting the objective-lens protector according to the first aspect on an objective lens mounted on a microscope main body; manipulating the objective-lens protector to remove the objective lens from the microscope main body; screwing a cap onto the threaded mount of the objective lens with a sealing member interposed between the cap and the objective lens; and immersing an assembly composed of the objective lens, the cap, and the objective-lens protector, which are secured to one another, in a liquid disinfectant to disinfect or sterilize the assembly.

According to this aspect, by operating the objective-lens protector to remove the objective lens from the microscope main body, hazardous substances adhering to the objective lens can be prevented from transferring to an operator's hand. Thus, the outer surface of the objective lens can easily be disinfected or sterilized simply by immersing the assembly into a liquid disinfectant with the opening of the objective lens being sealed by screwing the cap onto the threaded mount.

The above-described objective-lens treatment method preferably further includes the steps of removing the objective lens having the cap thereon from the objective-lens protector; and re-mounting the objective-lens protector on the cap screwed onto the objective lens to re-assemble the assembly, before the assembly is disinfected or sterilized.

By doing so, when the objective lens is mounted on the objective-lens protector, the outer surface of the objective lens, except for the threaded mount covered with the cap, can be exposed so that the entire outer surface of the objective lens can be easily disinfected or sterilized.

According to the objective-lens protector of the first aspect of the present invention, the objective lens is prevented from experiencing an external force, thus preventing the objective lens from being damaged, and the objective lens can be operated without having to directly touch the objective lens, thus preventing deposits on the objective lens before it is washed from transferring to an operator's hand and also preventing contamination on the operator's hand from transferring to the objective lens after it is washed.

The objective-lens treatment method of the second aspect of the present invention affords an advantage in that the cap can be screwed onto the objective lens that is removed from the microscope main body using the objective-lens protector and the objective lens with the cap can easily be disinfected or sterilized.

A third aspect of the present invention provides an objective-lens cleaner including a wiping member brought into contact with a surface of at least a tip of an objective lens and disposed so as to be capable of moving relative to the objective lens to wipe the surface of the objective lens; and a positioning mechanism configured to position the wiping member with respect to the objective lens.

According to this aspect, the wiping member is positioned with respect to the objective lens due to the effect of the positioning mechanism. By moving the wiping member relative to the objective lens in this state, the wiping member wipes the outer surface of the objective lens with the relative positional relationship between the wiping member and the objective lens outer surface maintained. As a result, the outer surface of the objective lens can be cleaned with the wiping member without causing the objective lens to experience an extreme external force.

In the above-described aspect, the wiping member is preferably made of sponge moistened with a disinfectant solution or a cleaning solution.

By doing so, when the wiping member is moved relative to the objective lens, the disinfectant solution or the cleaning solution contained in the sponge seeps out, thus allowing the outer surface of the objective lens to be efficiently cleaned.

Furthermore, the objective-lens cleaner may further include support members and a hinge member. In addition, the wiping member may include a plurality of wiping blocks that can be arranged adjacent to one another in a circumferential direction of the objective lens. Here, the support members are configured to support the plurality of wiping blocks, respectively, and the hinge member is configured to link the support members to one another such that the support members can swing.

By doing so, due to the operation of the hinge member, the support members can be swung between the open position where the plurality of wiping blocks are separated from each other and the closed position where the plurality of wiping blocks are arranged adjacent to each other. Thus, the objective lens can easily be inserted between the wiping blocks by moving the support members to the open position, whereas the plurality of wiping blocks can surround the objective lens by moving the support members to the closed position. Then, the entire outer surface of the objective lens can easily be cleaned by moving the wiping member relative to the objective lens while the objective lens is surrounded by the plurality of wiping blocks.

In the above-described aspect, the positioning mechanism may be formed in the wiping member, and the positioning mechanism may include an indentation having a shape that is substantially complementary to an external shape of the objective lens and having an inner diameter slightly smaller than an outer diameter of the objective lens.

With this structure, when the objective lens is placed in the indentation, the inner surface of the indentation is slightly deformed to receive the objective lens. At this time, the indentation applies a pressing force substantially uniformly over the entire outer surface of the objective lens, and thereby the objective lens is positioned at a location where the pressing forces remain balanced. If the wiping blocks are moistened with liquid such as a disinfectant solution, the liquid seeping out due to the deformation of the wiping blocks efficiently cleans the outer surface of the objective lens.

In the above-described aspect, the positioning mechanism may include a stationary portion that is fixed to the objective lens or a microscope main body on which the objective lens is mounted and includes a ring-shaped guide portion whose center substantially coincides with an axis of the objective lens; and a movable portion that is fitted into the guide portion of the stationary portion such that the movable portion can be rotated relative to the stationary portion, wherein the wiping member is mounted on the movable portion.

The wiping member mounted on the movable portion can be positioned with respect to the objective lens by fitting the movable portion into the guide portion of the stationary portion immobilized relative to the objective lens. Then, the wiping member is relatively moved while keeping a constant positional relationship with the objective lens by relatively moving the movable portion using the guide portion as a guide. Therefore, the objective lens can be prevented from experiencing an extreme external force more reliably, to facilitate cleaning of the outer surface of the objective lens.

According to this aspect, not only can the objective lens be easily cleaned but also the objective lens can be protected from damage while it is transported, stored, handled, and so on.

BRIEF DESCRIPTION OF THE SEVERAL VIEWS OF THE DRAWINGS

FIG. 9A is a cross-sectional view of a mounting portion, and FIG. 9B is a partially cut away side elevational view of the mounting portion.

DETAILED DESCRIPTION OF THE INVENTION

An objective-lens protector 1 according to a first embodiment of the present invention and an objective-lens treatment method using the objective-lens protector 1 will now be described with reference to FIGS. 1 to 6.

Figure 2:
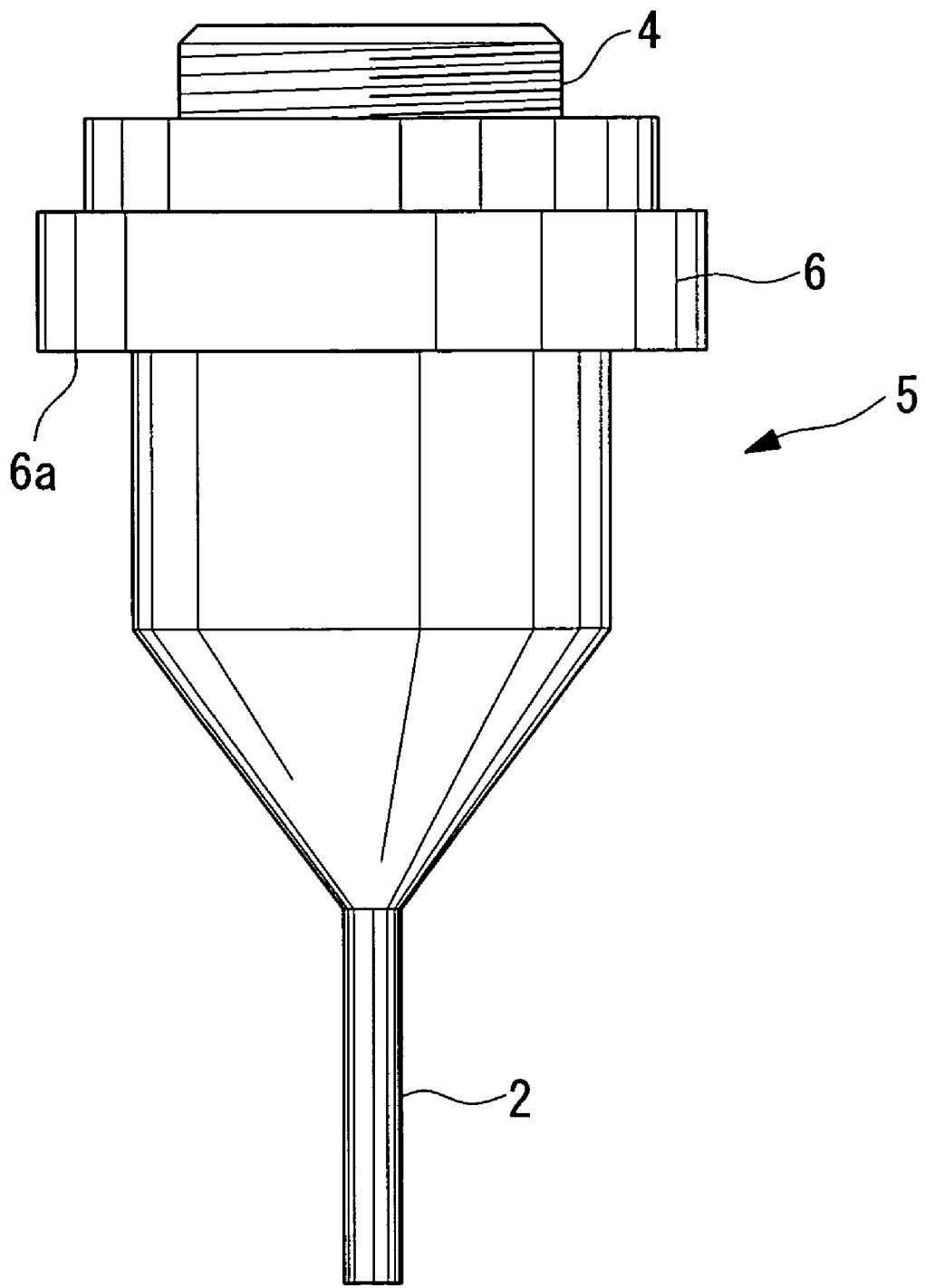
FIG. 2 is a side elevational view of one example of an objective lens which is protected by the objective-lens protector of FIG. 1.

Referring to FIG. 2, the objective-lens protector 1 according to this embodiment is a unit for protecting an objective lens 5 having a small-diameter tip 2 at one end thereof and having a threaded mount 4 for securing the objective lens 5 to a microscope main body 3 (refer to FIG. 3) at the other end thereof. The objective lens 5 includes a large-diameter portion 6 adjacent to the threaded mount 4 in the longitudinal direction.

Figure 1:
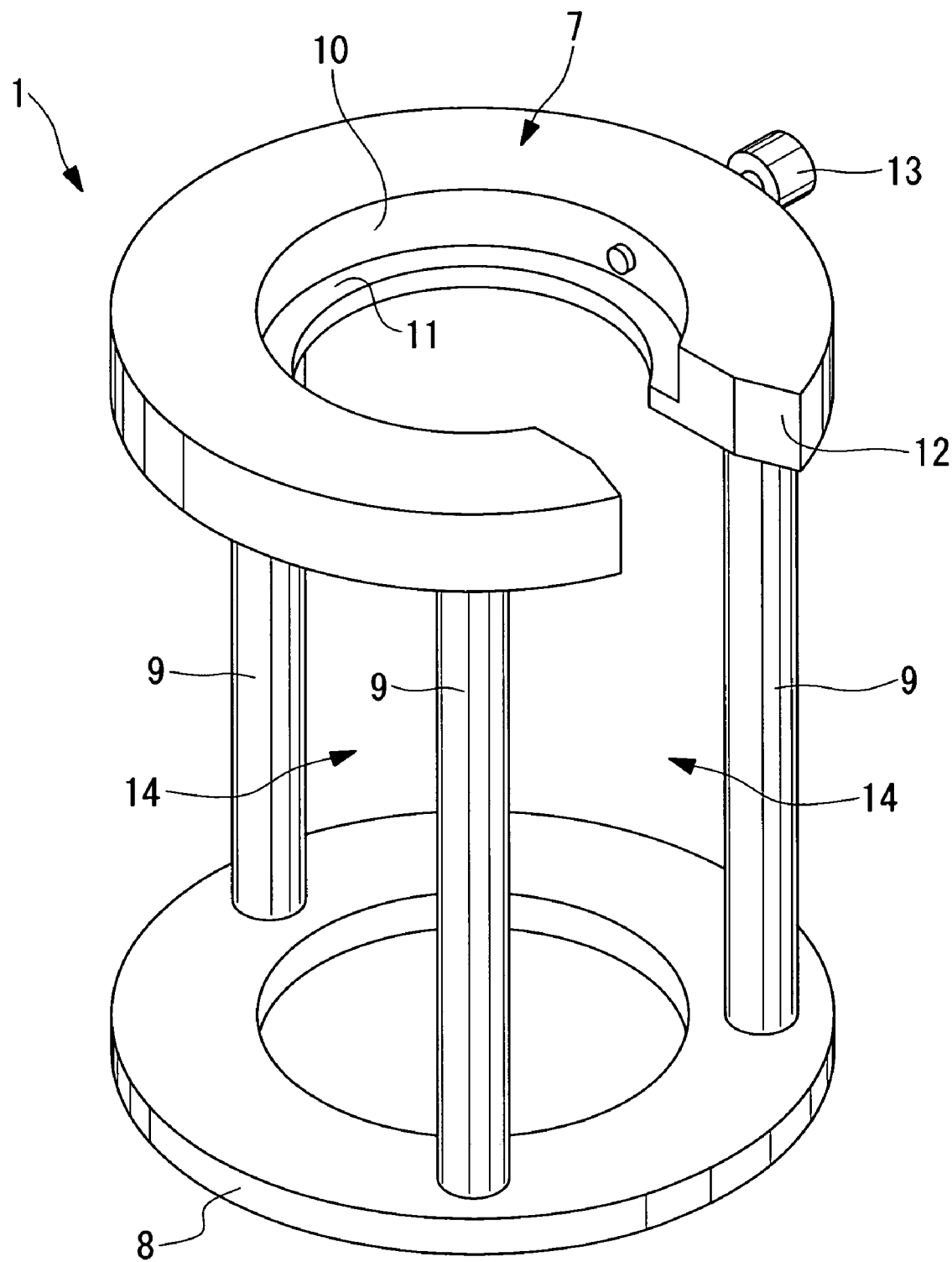
FIG. 1 is a perspective view of an objective-lens protector according to a first embodiment of the present invention.

Referring to FIG. 1, the objective-lens protector 1 according to this embodiment is constructed by linking a substantially ring-shaped mounting portion 7 and a ring-shaped base 8 via three columnar members (protecting members) 9. The mounting portion 7 includes a central opening 10 for receiving the large-diameter portion 6 of the above-described objective lens 5; a stepped portion 11 receiving an end surface 6a of the large-diameter portion 6, i.e., the end surface 6a facing the tip of the objective lens 5; a cut-out portion 12 formed by cutting out a portion of the mounting portion 7 in the circumferential direction; and a setscrew (locking mechanism) 13 provided so as to be retractable in the radial direction.

Figure 3:
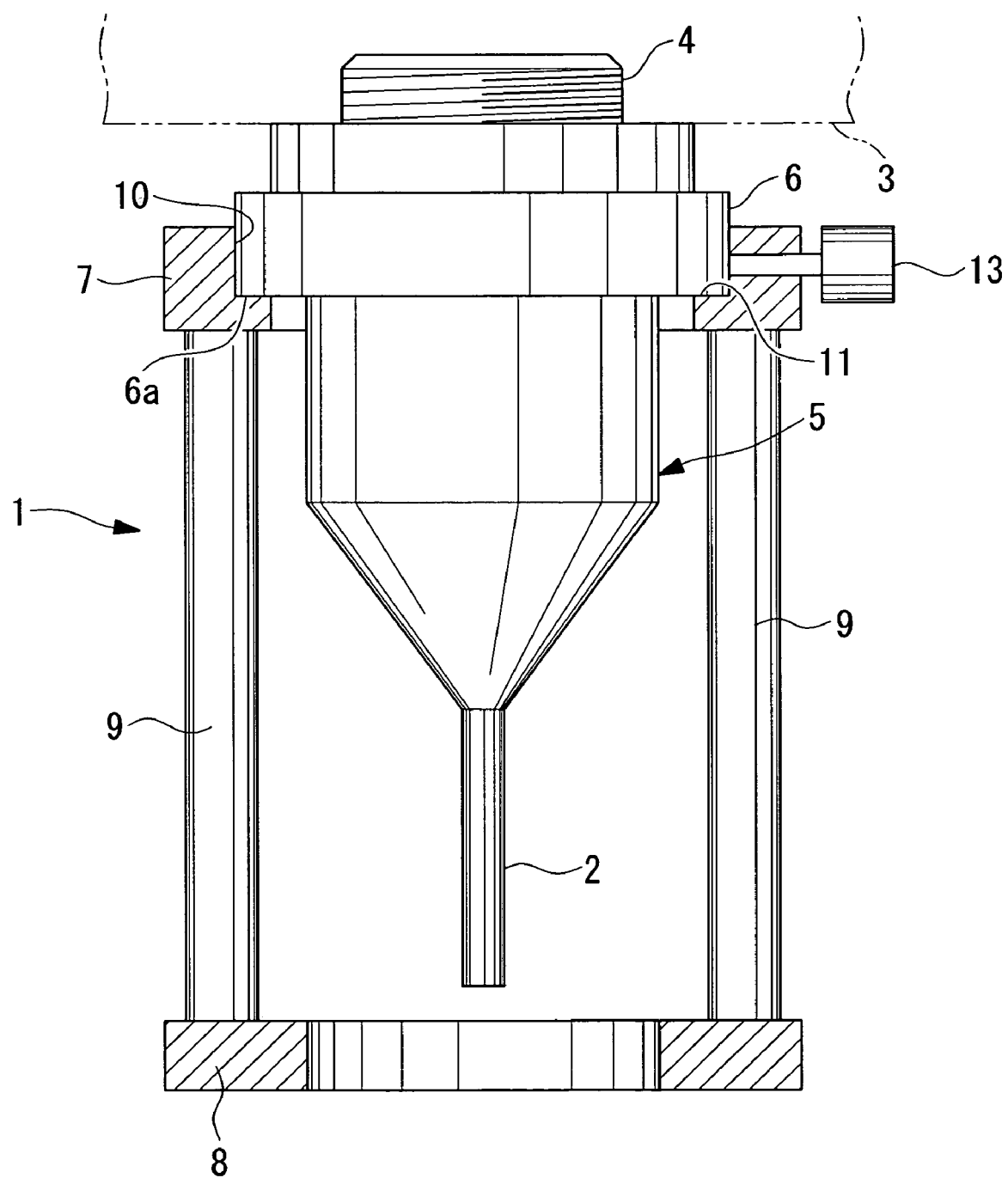
FIG. 3 is a partially cut away side elevational view of the objective-lens protector of FIG. 1 when mounted on an objective lens.

Referring to FIG. 3, the distance between the mounting portion 7 and the base 8 is set such that the small-diameter tip 2 of the objective lens 5 is disposed between the mounting portion 7 and the base 8 when the end surface 6a of the large-diameter portion 6 of the objective lens 5 is in contact with the stepped portion 11. When the objective lens 5 is mounted on the mounting portion 7 such that the end surface 6a of the large-diameter portion 6 is in contact with the stepped portion 11, the center of the objective lens 5 is substantially aligned with the center of the objective-lens protector 1.

Furthermore, the above-described columnar members 9 are arranged at sufficiently large distances along the radial direction from the objective lens 5 when disposed substantially in the center of the objective-lens protector 1. Because of this, when an operator grips the objective-lens protector 1 from outside, the operator's hand does not touch the outer surface of the objective lens 5 disposed in the central position.

Referring back to FIG. 1, a gap (through-hole) 14 that is large enough to allow the objective lens 5 to be seen or washed from outside is defined between each pair of columnar members 9.

Figure 4:
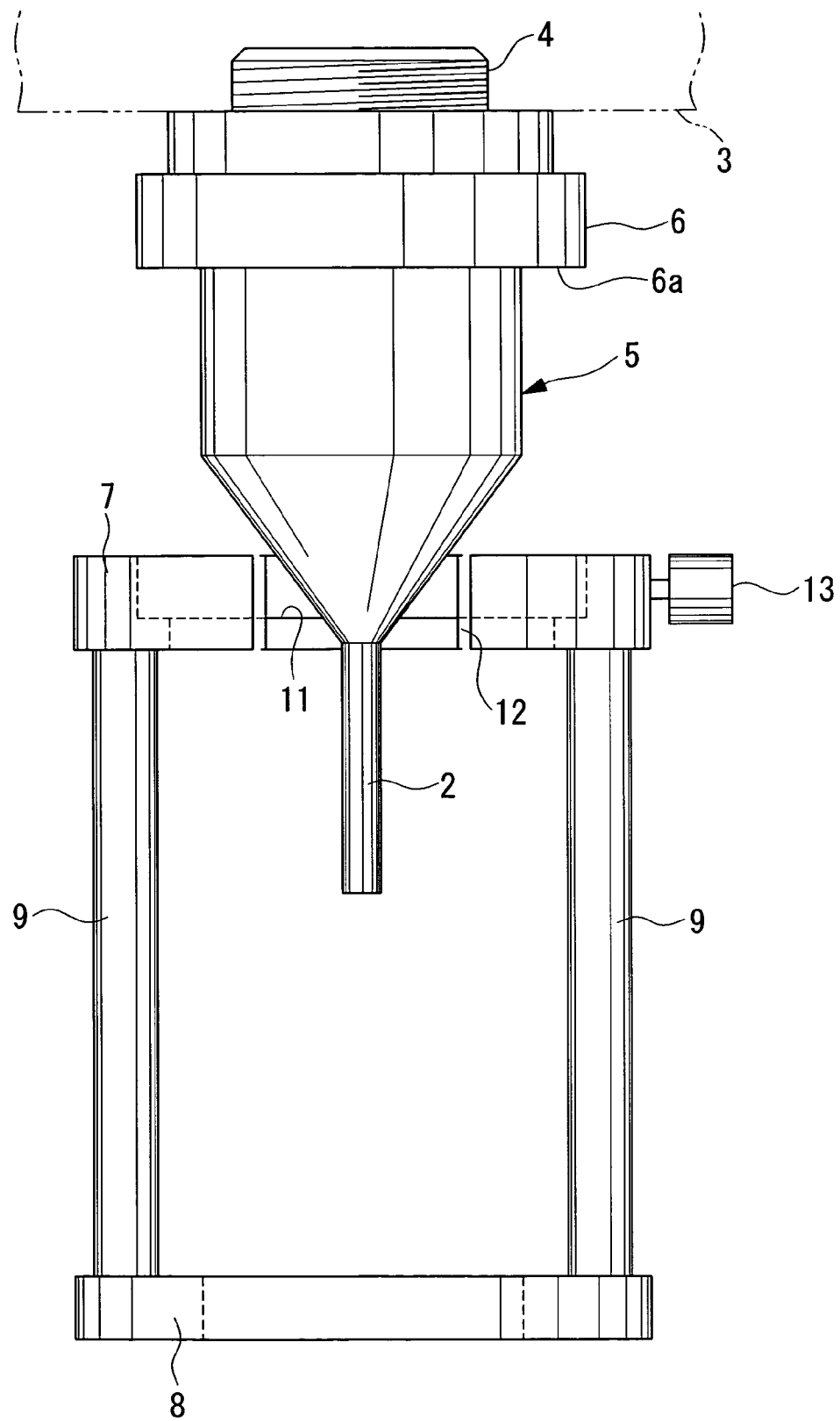
FIG. 4 is a side elevational view in which an objective lens mounted on a microscope main body passes through a cut-out portion of a mounting portion of the objective-lens protector.

Referring to FIG. 4, the above-described cut-out portion 12 has a width larger than the diameter of the objective lens 5 as measured at a longitudinal midway position of the objective lens 5. Because of this, in order to mount or remove the objective-lens protector 1 onto or from the objective lens 5, it is not necessary to move the objective-lens protector 1 in the optical-axis direction to receive or remove the objective lens 5 by passing the small-diameter tip 2 through the ring of the mounting portion 7. Instead, the objective lens 5 can be moved in the radial direction through the cut-out portion 12 at a longitudinal midway position thereof, as shown in FIG. 4.

When the setscrew 13 is tightened when the end surface 6a of the large-diameter portion 6 is in contact with the stepped portion 11 of the mounting portion 7, the tip of the setscrew 13 presses against the outer circumferential surface of the large-diameter portion 6 inwards in the radial direction. As a result, the objective lens 5 and the objective-lens protector 1 are secured to each other due to the friction between the tip of the setscrew 13 and the outer circumferential surface of the large-diameter portion 6 so that they do not move relative to each other in the circumferential direction or the axial direction.

The operation of the objective-lens protector 1 according to this embodiment, with the above-described structure, will be described below.

In order to mount the objective lens 5 on the objective-lens protector 1 according to this embodiment, the objective lens 5 is first inserted through the central opening 10 of the mounting portion 7 while the setscrew 13 provided on the mounting portion 7 is retracted sufficiently outwardly in the radial direction, and then the end surface 6a of the large-diameter portion 6 of the objective lens 5 is made to abut against the stepped portion 11 of the mounting portion 7. In this state, the objective lens 5 is positioned substantially in the center of the three columnar members 9, so that the outer surface of the objective lens 5 is prevented from being accidentally touched from the outside, unless an operator deliberately inserts his hand into a gap between the columnar members 9.

Next, when the setscrew 13 is tightened inwards in the radial direction, the tip of the setscrew 13 moves inwards in the radial direction to press against the outer circumferential surface of the large-diameter portion 6 of the objective lens 5 disposed in the central opening 10. As a result, because of the friction between the tip of the setscrew 13 and the outer circumferential surface of the large-diameter portion 6, the objective lens 5 mounted on the objective-lens protector 1 is secured so as not to rotate in the circumferential direction or come off in the axial direction.

As described above, according to the objective-lens protector 1 of this embodiment, by immobilizing the objective lens 5, the small-diameter tip 2 of the objective lens 5 can be prevented from experiencing an external force and is thus protected from damage. Therefore, the objective lens 5 can be protected from an external force while being transported, stored, assembled, etc. by mounting the objective-lens protector 1 on the objective lens 5.

Furthermore, the objective-lens protector 1 allows the objective lens 5 to be handled without requiring an operator to directly touch the objective lens 5. This is advantageous especially if the objective lens 5 is contaminated after it has just been used for examination. In this manner, the operator's hand is protected from contamination on the objective lens 5.

For example, if body fluid, proteins, or the like of a specimen (not shown in the figure) are adhered to the small-diameter tip 2 of the objective lens 5 after microscope examination has been carried out with the objective lens 5 mounted on the microscope main body 3, the objective-lens protector 1 is mounted on the objective lens 5 mounted on the microscope main body 3, as shown in FIG. 3.

In this case, the objective lens 5 can be attached to the objective-lens protector 1 by moving the objective lens 5 in the radial direction through the cut-out portion 12 of the mounting portion 7 at a longitudinal midway position of the objective lens 5, as shown in FIG. 4. Therefore, the objective-lens protector 1 can be attached to the objective lens 5 even in a situation where a working space no longer than the entire length of the objective-lens protector 1 can be prepared around the objective lens 5 when mounted on the microscope main body 3.

In addition, since the objective lens 5 is secured so as not to move relative to the objective-lens protector 1 due to the effect of the setscrew 13, the operator can easily remove the objective lens 5 from the microscope main body 3 by rotating the objective-lens protector 1 about the optical axis of the objective lens 5.

When the operator handles the objective-lens protector 1 at this time, since he or she does not have to directly touch the surface of the objective lens 5, the operator's hand is protected from contamination on the objective lens 5. Furthermore, since the objective-lens protector 1 having an outer diameter larger than the large-diameter portion 6 of the objective lens 5 is rotated, only a small torque is required to easily remove the objective lens.

Furthermore, the objective-lens protector 1 allows the objective lens 5 to be handled without requiring an operator to directly touch the objective lens 5, as described above. This is also advantageous especially if the objective lens 5 is clean before it is used for examination. In this manner, the clean objective lens 5 is protected from contamination on the operator's hand.

For example, when the objective lens 5 is mounted on the microscope main body 3 after being washed, disinfected, or sterilized, the operator can manipulate the objective-lens protector 1 instead of directly touching the objective lens 5 with his or her hand. Therefore, the outer surface of the objective lens 5, after being sterilized etc., can be protected from contamination on the operator's hand to ensure that the subsequent microscope examination can be carried out with the clean objective lens 5. In addition, when the objective lens 5 is to be mounted on the microscope main body 3, only a small working space is required around the objective lens 5.

Figure 5:
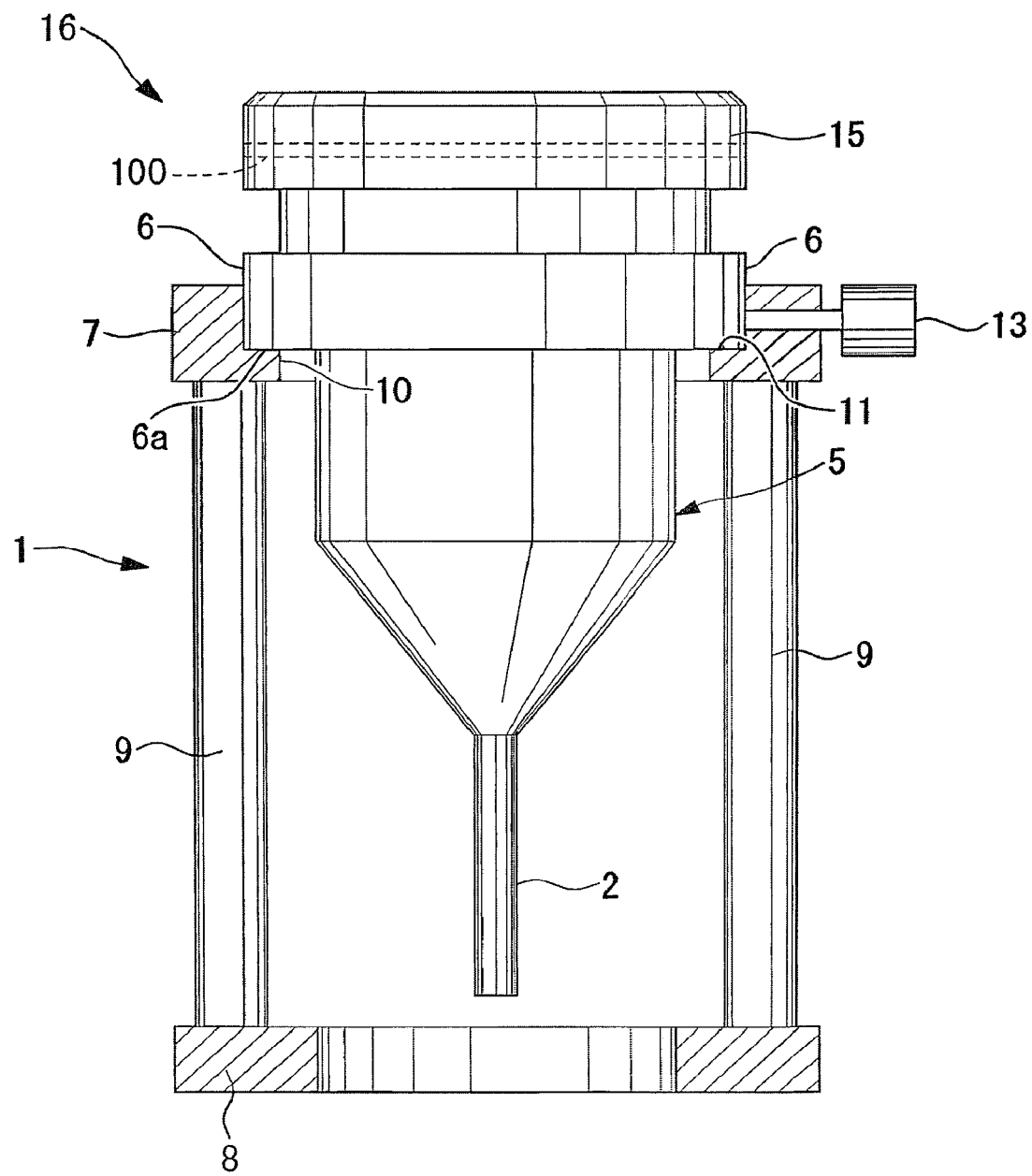
FIG. 5 is a partially cut away side elevational view of an assembly assembled by screwing a cap onto a threaded mount of an objective lens mounted on the objective-lens protector of FIG. 1.

An objective-lens treatment method according to this embodiment will now be described with reference to FIGS. 5 and 6.

According to an objective-lens treatment method of this embodiment, after microscope examination is finished, as described above, the objective-lens protector 1 is attached to the objective lens 5 mounted on the microscope main body 3, and the objective-lens protector 1 is then rotated to remove the objective lens 5 from the microscope main body 3. In this manner, it is possible to avoid directly touching the objective lens 5, which is possibly contaminated with the specimen, as described above.

In this state, the threaded mount 4 for securing the objective lens 5 to the microscope main body 3 is exposed from the objective-lens protector 1. In this embodiment, an opening (not shown in the figure) formed at the rear end of the objective lens 5 is sealed by screwing a cap 15 onto this threaded mount 4, as shown in FIG. 5. The cap 15 is provided with a sealing member 100, such as an O-ring, for sealing watertight the gap between the cap 15 and the objective lens 5 around the entire circumference thereof.

Figure 6:
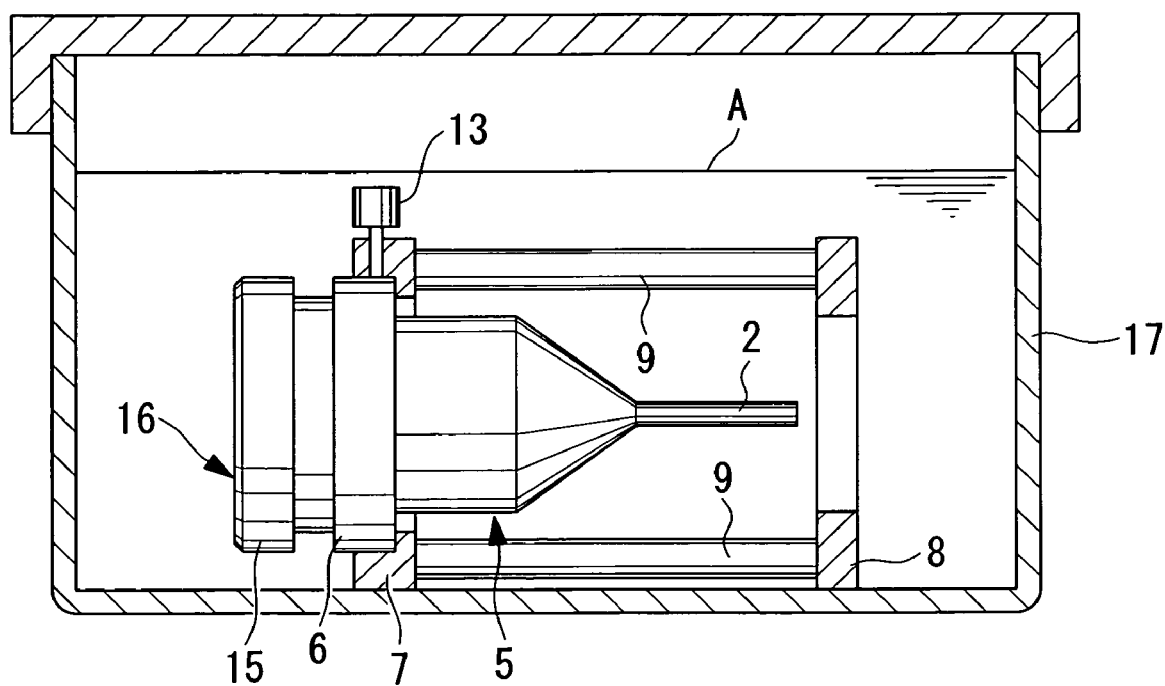
FIG. 6 illustrates a disinfection process in which the assembly of FIG. 5 is immersed in a disinfectant tank.

Then, an assembly 16 composed of the objective lens 5, the objective-lens protector 1, and the cap 15, with the opening sealed by the cap 15 as described above, is placed in a disinfectant tank or a sterilization tank 17 filled with a disinfectant solution or sterilizing solution A, as shown in FIG. 6.

For the disinfectant solution or sterilizing solution A, an alcohol, such as ethanol, aldehyde glutaral, phtharal, peracetic acid, aqueous hydrogen peroxide, or chlorine dioxide can be used, for example.

By doing so, the entire exposed surface of the objective lens 5 can be disinfected or sterilized easily and effectively. Because in this embodiment the contact part between the large-diameter portion 6 and the mounting portion 7 is difficult to disinfect or sterilize, this embodiment is advantageous especially for applications where mainly the small-diameter tip 2 of the objective lens 5 is contaminated. Furthermore, disinfection or sterilization of the threaded mount 4 and the opening at the rear end covered with the cap 15 is not usually required since these portions are accommodated inside the microscope main body 3 during microscope examination.

In this embodiment, since sufficiently large gaps 14 are defined between the columnar members 9 around the objective lens 5, the inner objective lens 5 can easily be seen from outside the objective-lens protector 1. Therefore, for example, the small-diameter tip 2 of the objective lens can easily be checked from outside to see if body fluid, blood, or proteins of the specimen are adhered to the small-diameter tip 2. Furthermore, if there are deposits such as body fluid, blood, etc. on the small-diameter tip 2, the objective lens 5 may be roughly washed through the gaps 14 between the columnar members 9 to remove such deposits from the objective lens 5 before disinfection or sterilization treatment is carried out. As a result, the disinfection or sterilization treatment is more effective.

After the assembly 16 is withdrawn from the disinfectant tank or the sterilization tank 17 and dried, the cap 15 can be removed to expose the threaded mount 4, and subsequently the cleaned objective lens 5 can be mounted on the apparatus main body 3 by rotating the objective-lens protector 1 to screw the threaded mount 4 into the apparatus main body 3. In this case, the operator's hand is prevented from directly touching the surface of the cleaned objective lens 5 while he or she is mounting the objective lens 5, and thus, the objective lens 5 is protected from contamination on the operator's hand. This allows the subsequent microscope examination to be carried out using the clean objective lens 5.

For the objective-lens protector 1 and the objective-lens treatment method according to this embodiment, the large-diameter portion 6 of the objective lens 5 is mounted on the mounting portion 7 of the objective-lens protector 1. Alternatively, a separate objective-lens protector 1' for use during disinfection or sterilization treatment may be prepared, as shown in FIG. 7.

Figure 7:
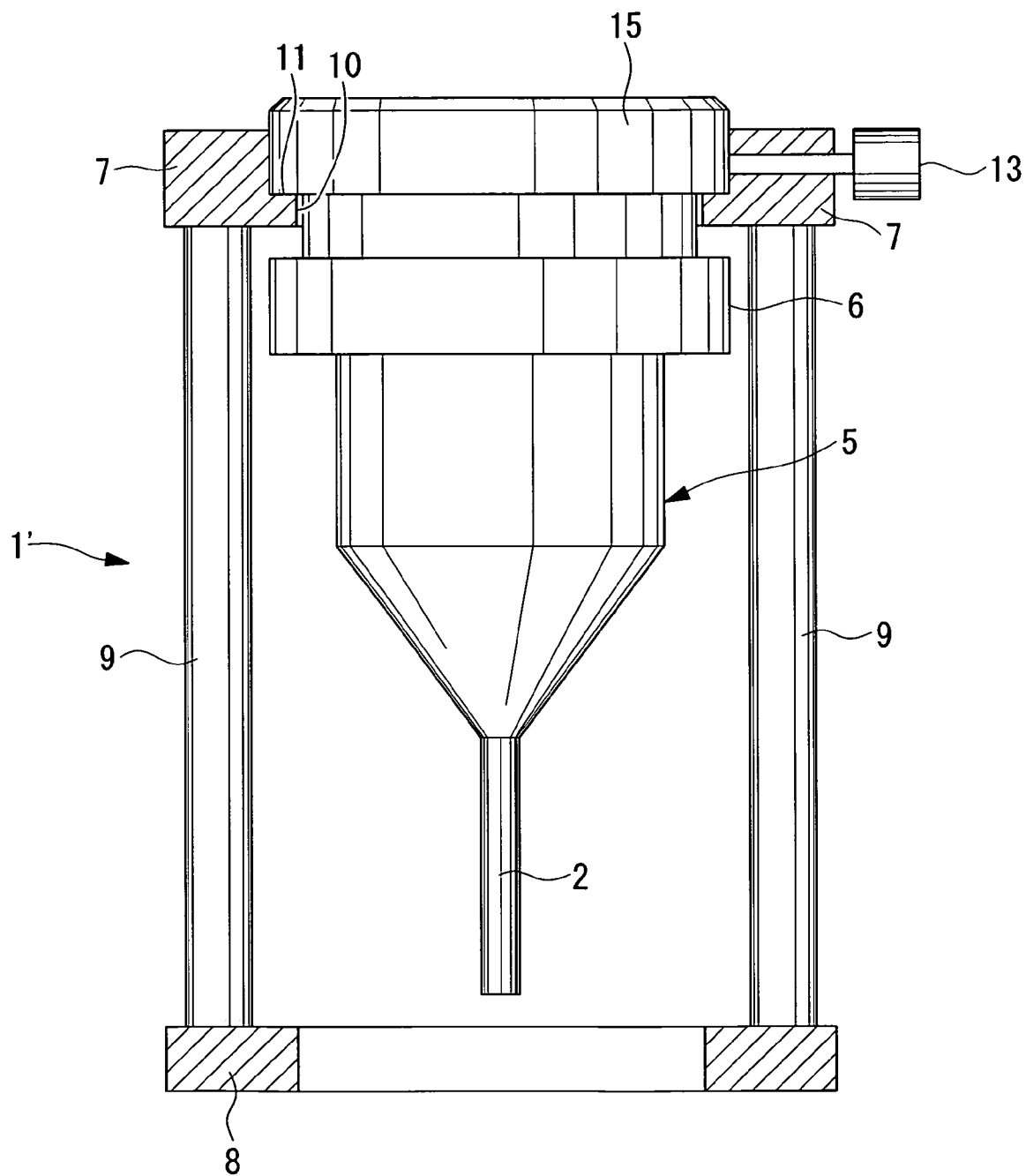
FIG. 7 is a partially cut away side elevational view of the objective-lens protector on which an objective lens is mounted by means of a cap screwed onto a threaded mount thereof.

Referring to FIG. 7, this objective-lens protector 1' secures the cap 15 to the mounting portion 7; that is, the cap 15 is screwed onto the threaded mount 4 of the objective lens 5. The objective-lens protector 1' has the same structure as that of the above-described objective-lens protector 1, except for the length of the columnar members 9. Furthermore, the size of the cut-out portion 12 of this objective-lens protector 1' needs to be large.

By mounting the objective lens 5 on the mounting portion 7 by means of the cap 15 as described above, the entire surface of the objective lens 5, except for the cap 15, can be exposed. Therefore, the entire surface of the objective lens 5 can be disinfected or sterilized efficiently.

This objective-lens protector 1' having the longer columnar members 9 could be used for attaching the objective lens 5 to or detaching the objective lens 5 from the microscope main body 3, as well as disinfecting or sterilizing the objective lens 5. This approach, however, is not preferable because any contamination on the large-diameter portion 6 could be transferred to the cap 15 via the mounting portion 7 while the objective lens 5 is used.

Figure 8:
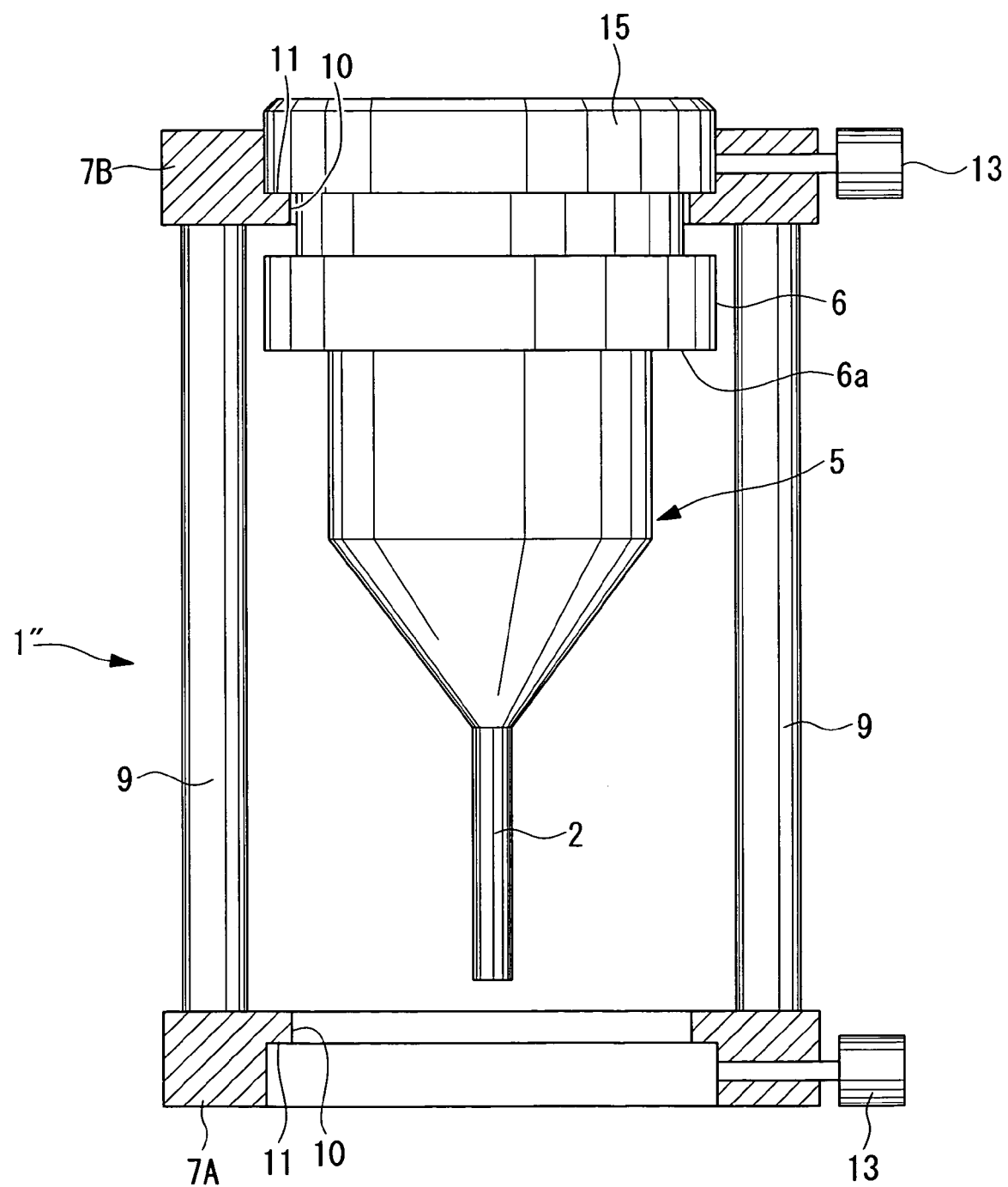
FIG. 8 is a partially cut away side elevational view of a modification of the objective-lens protector, where mounting portions are provided at both ends of columnar members.

An objective-lens protector 1", as shown in FIG. 8, is an alternative protector intended for use for both purposes while preventing the-above-described drawback from occurring. The objective-lens protector 1" includes columnar members 9 having a first mounting portion 7A at one end thereof and having a second mounting portion 7B at the other end thereof. With this structure, the large-diameter portion 6 can be mounted on the first mounting portion 7A when the objective lens 5 is attached to or detached from the microscope main body 3, whereas the objective lens 5 can be re-mounted on the second mounting portion 7B via the cap 15 to re-assemble the assembly 16 when the entire surface of the objective lens 5 is to be disinfected or sterilized. In this case, since the first mounting portion 7A in contact with the large-diameter portion 6 is exposed during disinfection or sterilization treatment, even if contamination is deposited on the large-diameter portion 6, the first mounting portion 7A can be disinfected or sterilized together while the objective lens 5 is being disinfected or sterilized.

Although this embodiment has been described by way of an example where the outer diameter of the cap 15 is equal to the outer diameter of the large-diameter portion 6, the two outer diameters may differ from each other.

In this embodiment, the outer circumferential surface of the large-diameter portion 6 or the outer circumferential surface of the cap 15 is pressed in the radial direction using the setscrew 13 provided on the mounting portion 7, 7A, or 7B to secure the objective lens 5 and the objective-lens protector 1' or 1" due to its friction. It is also acceptable to more securely fix the objective lens 5 and the objective-lens protector 1' or 1" by providing a plurality of indentations (not shown in the figure) on the outer circumferential surface of the large-diameter portion 6 and/or the cap 15 at predetermined intervals in the circumferential direction and to bring the tip of the setscrew 13 into engagement with one of the indentations.

Figure 9A:
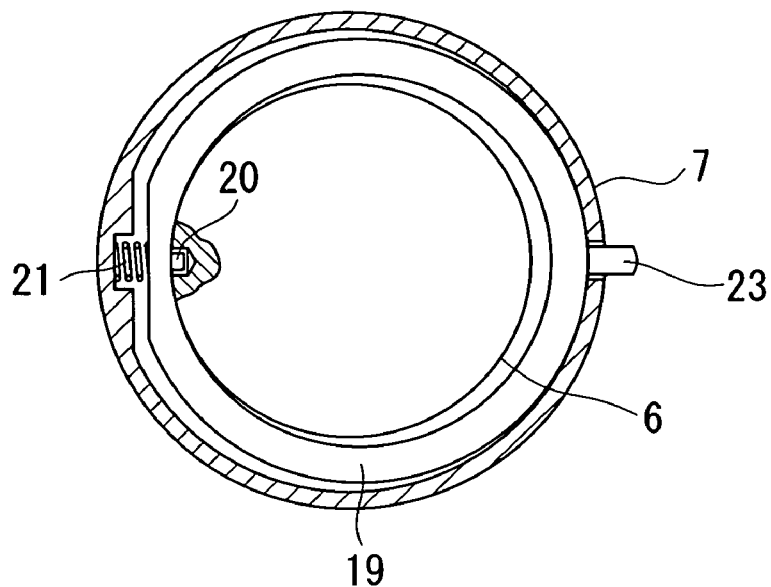
FIGS. 9A and 9B illustrate a second modification of the objective-lens protector of FIG. 1.
Figure 9B:
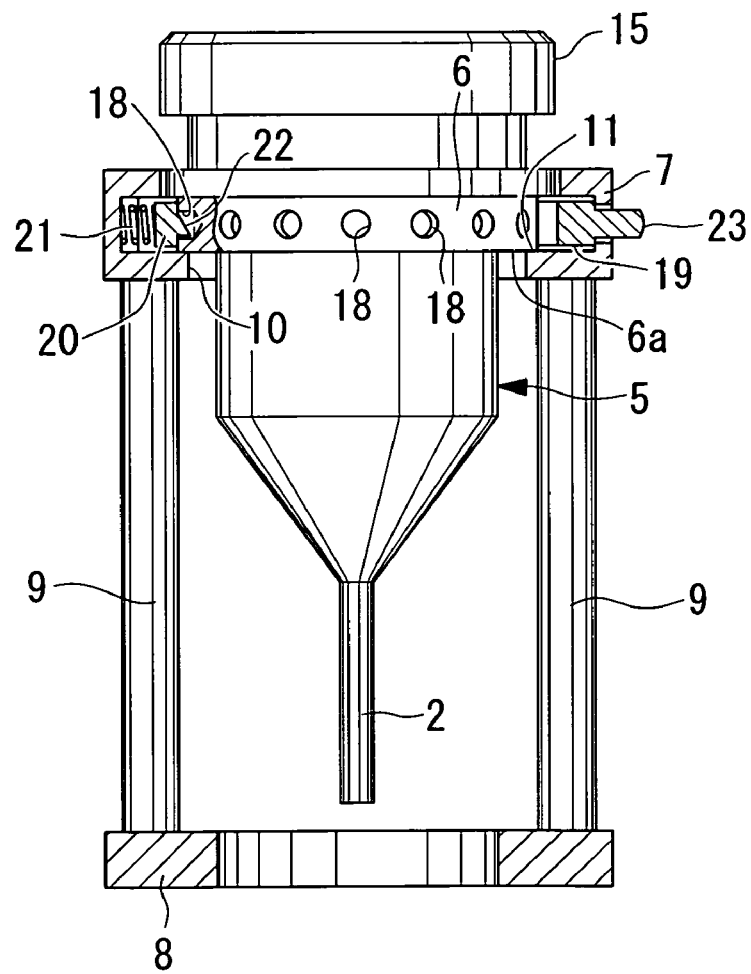

Furthermore, it is conceivable that the objective-lens protector 1 can be attached to and detached from the objective lens 5 with a single operation, for example, as shown in FIGS. 9A and 9B. Referring to 9B, a plurality of indentations 18 is formed in the outer circumferential surface of the large-diameter portion 6 of the objective lens 5 at predetermined intervals in the circumferential direction. Then, as shown in FIG. 9A, a movable ring 19 surrounding the large-diameter portion 6 is disposed in the central opening 10 of the mounting portion 7, and a protrusion 20 extending inwards in the radial direction is provided on the inner surface of the movable ring 19 so that the protrusion 20 is constantly urged inwards in the radial direction by the spring 21 interposed between the mounting portion 7 and the movable ring 19. A tapered surface 22 is formed at the tip of the protrusion 20, and furthermore, a pressing protrusion 23 for moving the protrusion 20 outwards in the radial direction against the resilient force of the spring 21 is formed on the opposite side to the protrusion 20 in the diameter direction of the movable ring 19.

With the above-described structure, as the objective lens 5 is moved in the axial direction through the central opening 10 of the mounting portion 7 into the objective-lens protector 1, the large-diameter portion 6 presses against the tapered surface 22 of the protrusion 20 to retract the protrusion 20 outwards in the radial direction. Thereafter, when the objective lens 5 is advanced through the central opening 10 until the protrusion 20 meets one of the indentations 18 of the large-diameter portion 6, the large-diameter portion 6 is released from the tapered surface 22, and the protrusion 20 fits into the indentation 18, which is indented inwards in the radial direction, due to the elastic restoring force of the spring 21. As a result, the objective lens 5 and the objective-lens protector 1 are secured to each other so that they do not move relative to each other. When the objective-lens protector 1 is to be detached from the objective lens 5, the pressing protrusion 23 is pressed inwards in the radial direction to move the movable ring 19 so that the protrusion 20 is retracted outwards in the radial direction. In this manner, the protrusion 20 is disengaged from the indentation 18.

Furthermore, although the above-described embodiment has been described by way of an example where only one setscrew 13 is provided on the mounting portion 7, two or more setscrews 13 may be provided.

Figure 10:
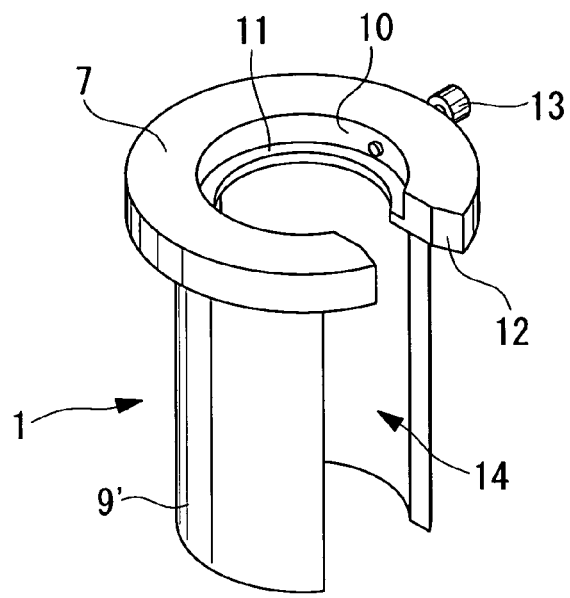
FIG. 10 is a perspective view of a third modification of the objective-lens protector of FIG. 1.

In addition, although this embodiment has been described by way of example of the three columnar members 9 that serve as protecting members surrounding the exterior of the objective lens 5, two or more columnar members 9 may be provided instead. The shape of the columnar members 9 is not particularly limited. A tubular member 9', as shown in FIG. 10, may be used as a protecting member in place of the columnar members 9. In this case, a plurality of throughholes (not shown in the figure) may be formed on the tubular member 9' in order to enhance visibility from outside, ease of cleaning, and the ability of the disinfectant solution A to flow through, for example.

Figure 11:
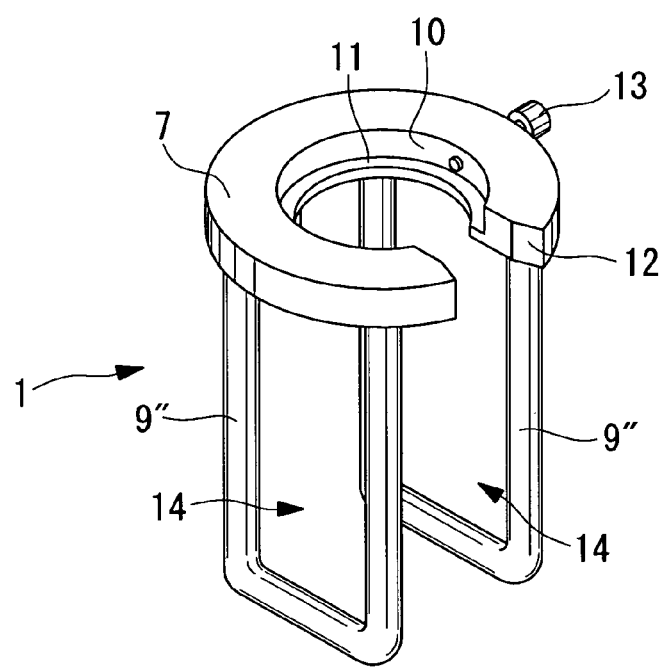
FIG. 11 is a perspective view of a fourth modification of the objective-lens protector of FIG. 1.

Furthermore, the protecting members may be formed of elongated members 9" that are bent as shown in FIG. 11.

An objective-lens cleaner according to a second embodiment of the present invention will now be described with reference to FIGS. 12 to 15.

Figure 13:
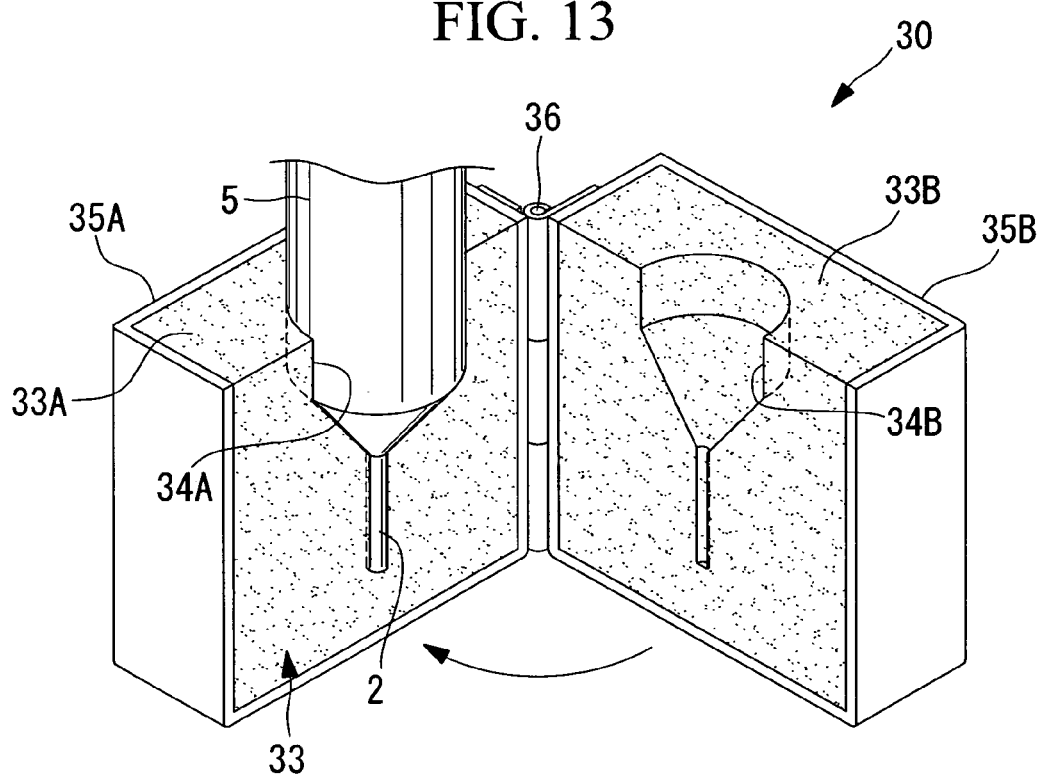
FIG. 13 is a perspective view illustrating one example of mounting the objective-lens cleaner of FIG. 12 on an objective lens.

An objective-lens cleaner 30 according to this embodiment cleans, for example, the outer surface of an objective lens 5 (refer to FIG. 13) when mounted on a microscope main body (not shown in the figure). The objective-lens cleaner 30 includes a wiping member 33 which is brought into contact with the objective lens 5, as shown in FIG. 13.

The wiping member 33 is made of sponge and includes two wiping blocks 33A and 33B that are formed by dividing a rectangular block large enough to store substantially the entire body of the objective lens 5 into two halves at the plane passing through the central axis of the objective lens 5.

Figure 12:
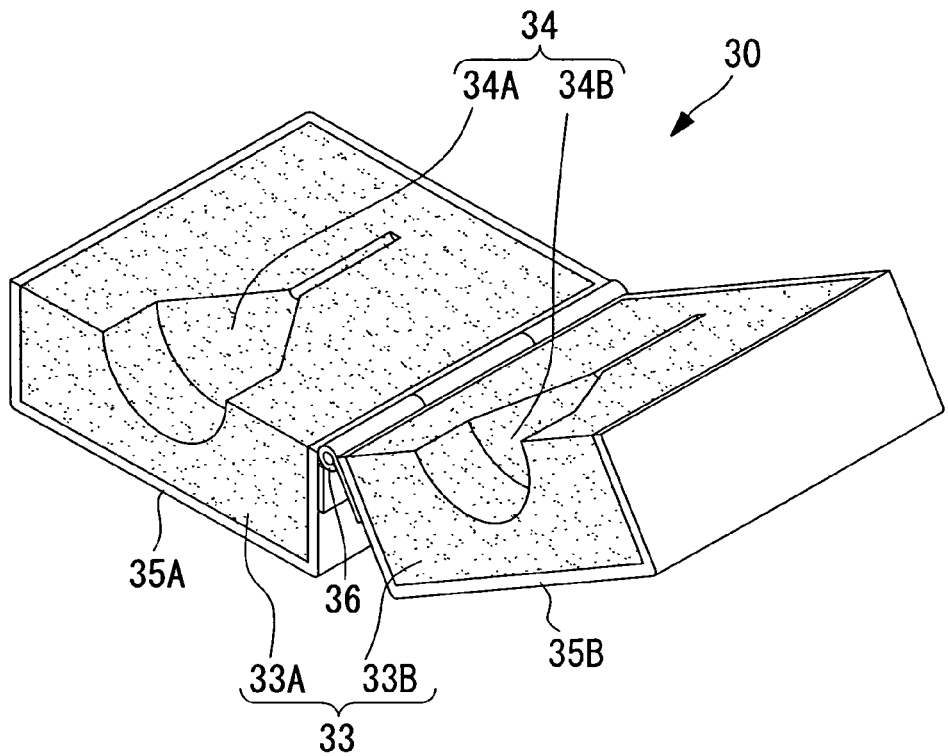
FIG. 12 is a perspective view of an objective-lens cleaner according to a second embodiment of the present invention.

Referring to FIG. 12, the wiping blocks 33A and 33B include indentations 34A and 34B, respectively, formed in the joining faces of the wiping blocks 33A and 33B such that the indentations 34A and 34B form a shape that is substantially complementary to the external shape of the objective lens 5 when the wiping blocks 33A and 33B are joined together at those faces.

The sizes of the indentations 34A and 34B formed in the wiping blocks 33A and 33B are slightly smaller than the external size of objective lens 5. As result, when the objective lens 5 is placed in the wiping member 33 so as to fit in the indentations 34A and 34B, the wiping blocks 33A and 33B are slightly compressed by the objective lens 5, thus causing the indentations 34A and 34B to be elastically deformed and hence to slightly expand. Therefore, the inner surfaces of the indentations 34A and 34B are pressed onto the outer surface of the objective lens 5 due to the resilient force of the indentations 34A and 34B, thereby positioning the wiping blocks 33A and 33B with respect to the objective lens 5. In short, the indentations 34A and 34B constitute a positioning mechanism 34.

The wiping blocks 33A and 33B are moistened with a disinfectant solution or a cleaning solution such as an alcohol, such as ethanol, aldehyde glutaral, phtharal, peracetic acid, aqueous hydrogen peroxide, or chlorine dioxide.

The two wiping blocks 33A and 33B are supported by two support members 35A and 35B, respectively. The support members 35A and 35B are each realized by a sheet member that covers the four surfaces of the corresponding wiping block 33A or 33B, except for the joining faces of the wiping blocks 33A and 33B and the surfaces through which the objective lens 5 passes.

Furthermore, the two support members 35A and 35B are linked to each other so that they can be swung open by means of a hinge member 36. As a result, when the two support members 35A and 35B are brought near each other through the operation of the hinge member 36 until the two wiping blocks 33A and 33B meet each other at the joining faces (closed position), they have the shape of a box covering the wiping member 33.

Therefore, when the support members 35A and 35B are swung to the closed position by means of the hinge member 36, the support members 35A and 35B are closed to cause the internal wiping blocks 33A and 33B to meet each other, and thereby, the indentations 34A and 34B formed in both the wiping blocks 33A and 33B come together. In this manner, a hollow with a shape substantially complementary to the external shape of the objective lens 5 is defined.

Furthermore, when moved apart (open position) by means of the hinge member 36, the two support members 35A and 35B open to expose the internal wiping blocks 33A and 33B.

The operation of the objective-lens cleaner 30 according to this embodiment, with the above-described structure, will be described below.

Figure 14:
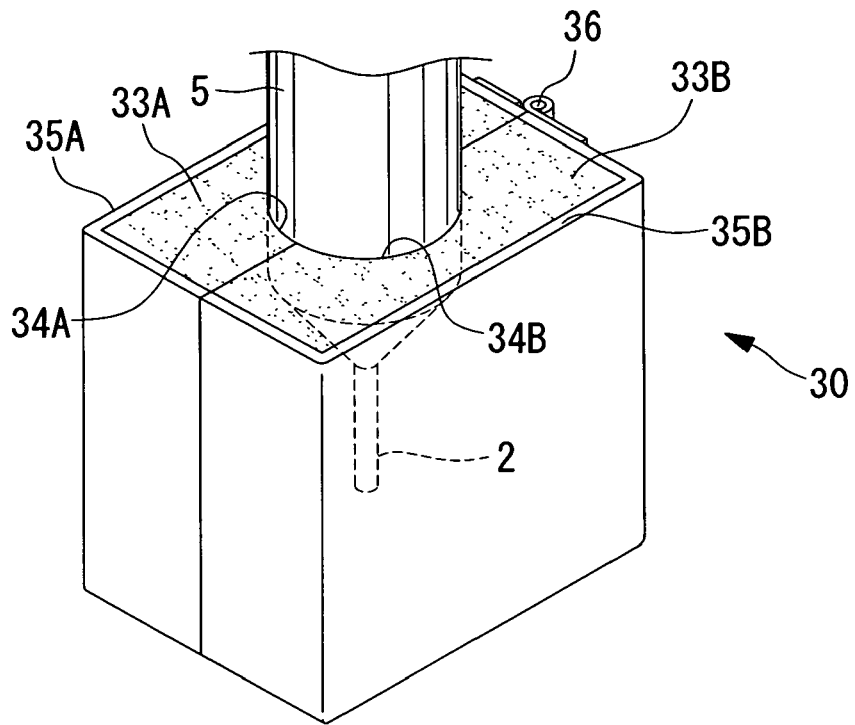
FIG. 14 is a perspective view illustrating the process of cleaning an objective lens using the objective-lens cleaner of FIG. 12.

In order to clean the outer surface of the objective lens 5 using the objective-lens cleaner 30 according to this embodiment, the wiping blocks 33A and 33B held by the support members 35A and 35B are exposed by swinging the two support members 35A and 35B to the open position by means of the hinge member 36, as shown in FIG. 12. Then, as shown in FIG. 13, the indentation 34A or 34B formed in the exposed wiping block 33A (or wiping block 33B) is positioned along the side surface of the objective lens 5 mounted on a microscope main body. In this state, the two support members 35A and 35B are swung to the closed position through the operation of the hinge member 36. As a result, the objective lens 5 is interposed between the wiping blocks 33A and 33B, as shown in FIG. 14.

Figure 15:
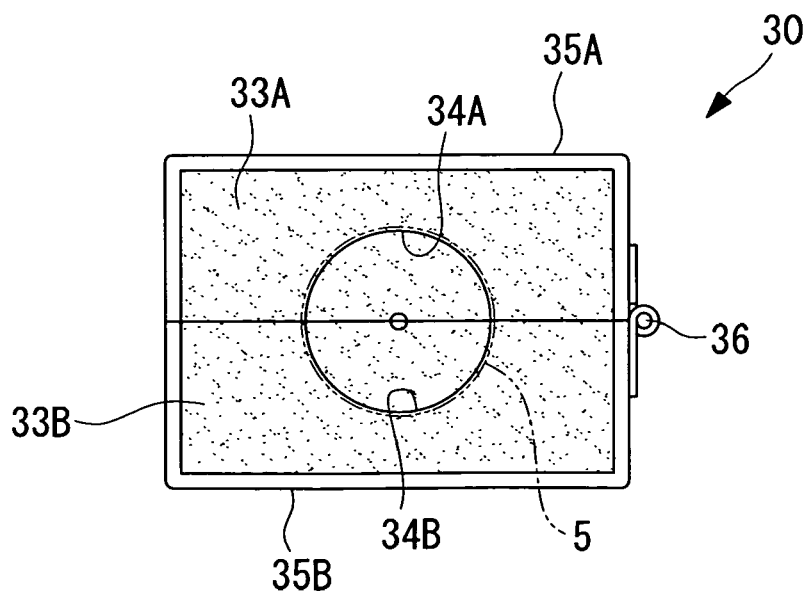
FIG. 15 is a front elevational view of the objective-lens cleaner of FIG. 12 as viewed from an indentation side.

Referring to FIG. 15, since the indentations 34A and 34B formed in the wiping blocks 33A and 33B, respectively, are slightly smaller than the external size of the objective lens 5, the wiping blocks 33A and 33B are elastically deformed when the objective lens 5 is pressed between the wiping blocks 33A and 33B, so that the wiping blocks 33A and 33B press against the outer surface of the objective lens 5 due to the resilient force thereof. Since the wiping blocks 33A and 33B are made of sponge moistened with a disinfectant solution or a cleaning solution, the disinfectant solution or the cleaning solution can be made to seep out by compressing the wiping blocks 33A and 33B.

In this state, the objective-lens cleaner 30 can be moved relative to the objective lens 5 as it is rotated about the axis of the objective lens 5. By doing so, the wiping blocks 33A and 33B are pressed onto the outer surface of the objective lens 5 by a predetermined pressing force and are moved relative to the outer surface of the objective lens 5 while the disinfectant solution or cleaning solution seeps out. Thus, contamination deposited on the outer surface of the objective lens 5 is wiped off by the wiping blocks 33A and 33B.

In this case, according to the objective-lens cleaner 30 of this embodiment, the outer surface of the objective lens 5 can easily be wiped merely by rotating the objective-lens cleaner 30 relative to the objective lens 5. Furthermore, in this case, since the objective lens 5 and the wiping blocks 33A and 33B are maintained to keep a constant positional relationship by the indentations 34A and 34B formed in the wiping blocks 33A and 33B, the objective lens 5 is prevented from experiencing extreme external forces, and therefore, the small-diameter tip 2 is protected from damage due to an external force even if the objective lens 5 has a small-diameter tip 2 at the front end thereof, as shown in FIG. 13.

Figure 16:
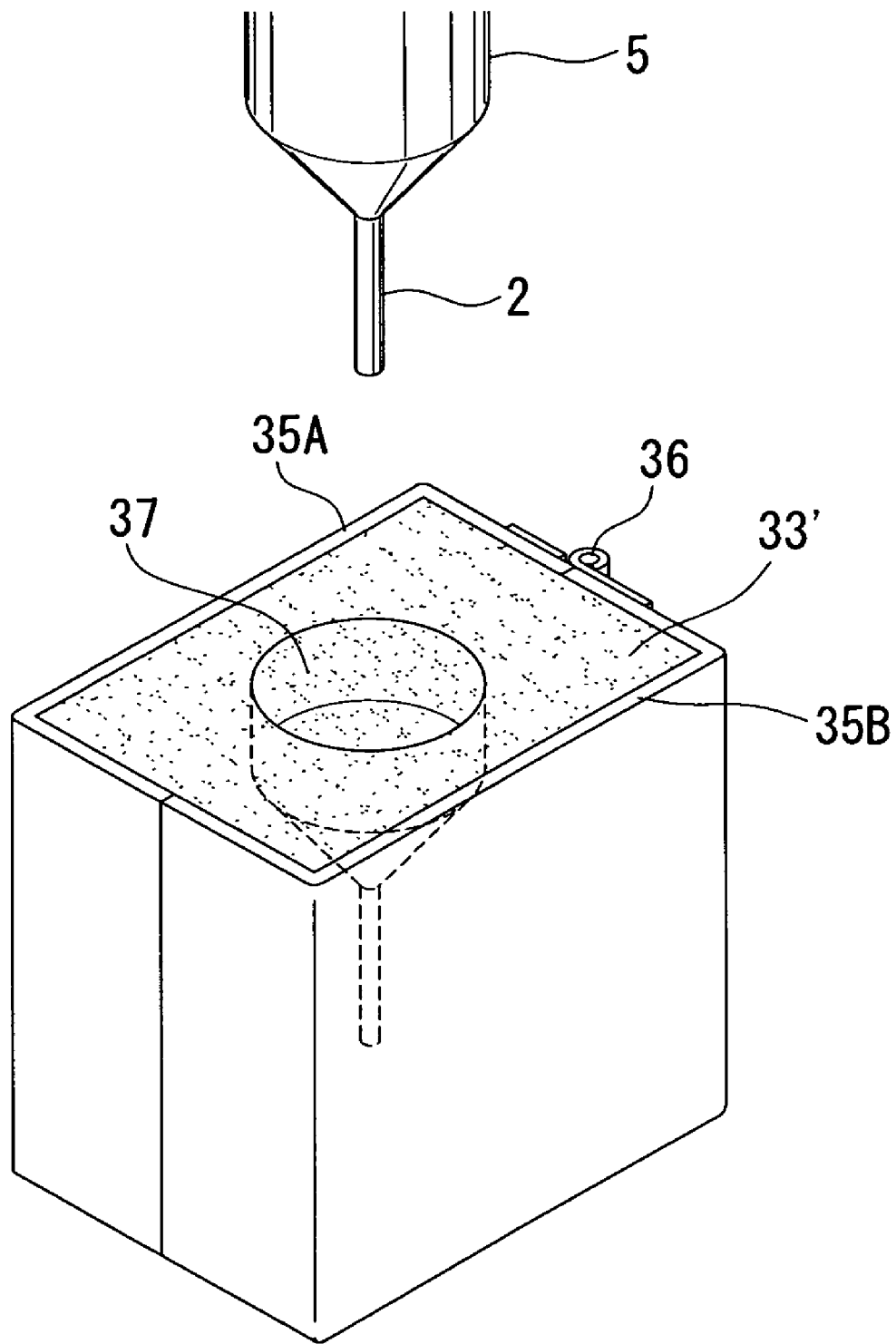
FIG. 16 is a perspective view of a modification of the objective-lens cleaner of FIG. 12.
Figure 17:
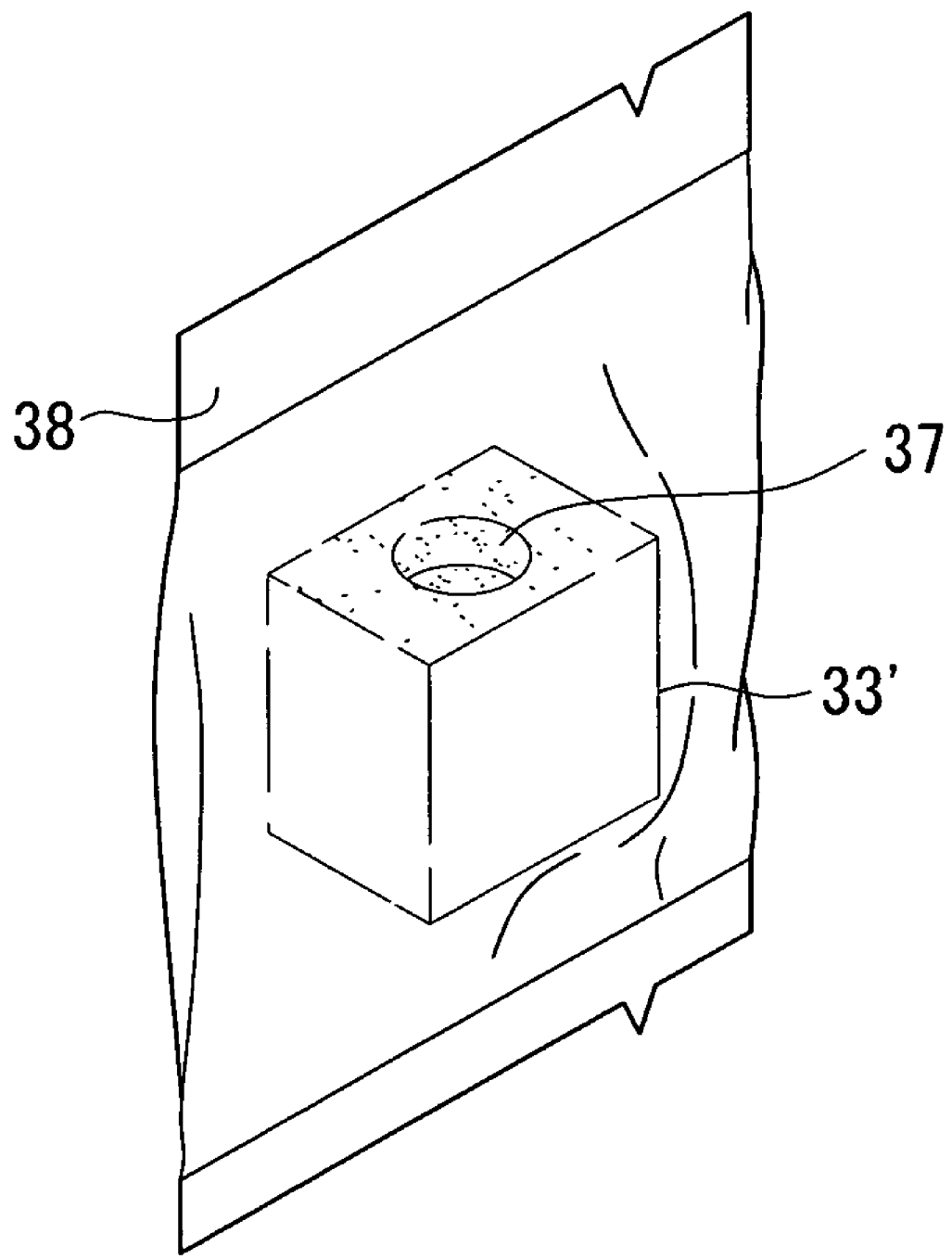
FIG. 17 is a perspective view of one example of a wiping member used with the objective-lens cleaner of FIG. 16.

In this embodiment, the objective lens 5 is positioned along one of the two indentations 34A and 34B formed in the two separate wiping blocks 33A and 33B and is then interposed between the two wiping blocks 33A and 33B so that the two wiping blocks 33A and 33B surround the entire circumference of the objective lens 5. Alternatively, for example, a wiping member 33' formed of a single piece of sponge having an opening through which the objective lens 5 can be inserted may be employed instead, as shown in FIG. 16. In this manner, when the objective lens 5 is inserted through an opening 37 formed in the wiping member 33', the wiping member 33' can come into contact with the entire circumference of the objective lens 5 starting with the tip thereof. In this case, the hinge member 36 of the support members 35A and 35B is used to open/close the support members 35A and 35B when the wiping member 33' is attached to or detached from the support members 35A and 35B. In addition, such a single wiping member 33' may be realized as a disposable part, which is, for example, pre-moistened with a disinfectant solution or a cleaning solution and stored in a sealed bag 38, as shown in FIG. 17.

An objective-lens cleaner 40 according to a third embodiment of the present invention will now be described with reference to FIGS. 18 to 20.

In this embodiment, components that are the same as or equivalent to those used in the objective-lens cleaner 30 according to the foregoing second embodiment are denoted by the same reference numerals, and thus a description thereof will be omitted.

Figure 18:
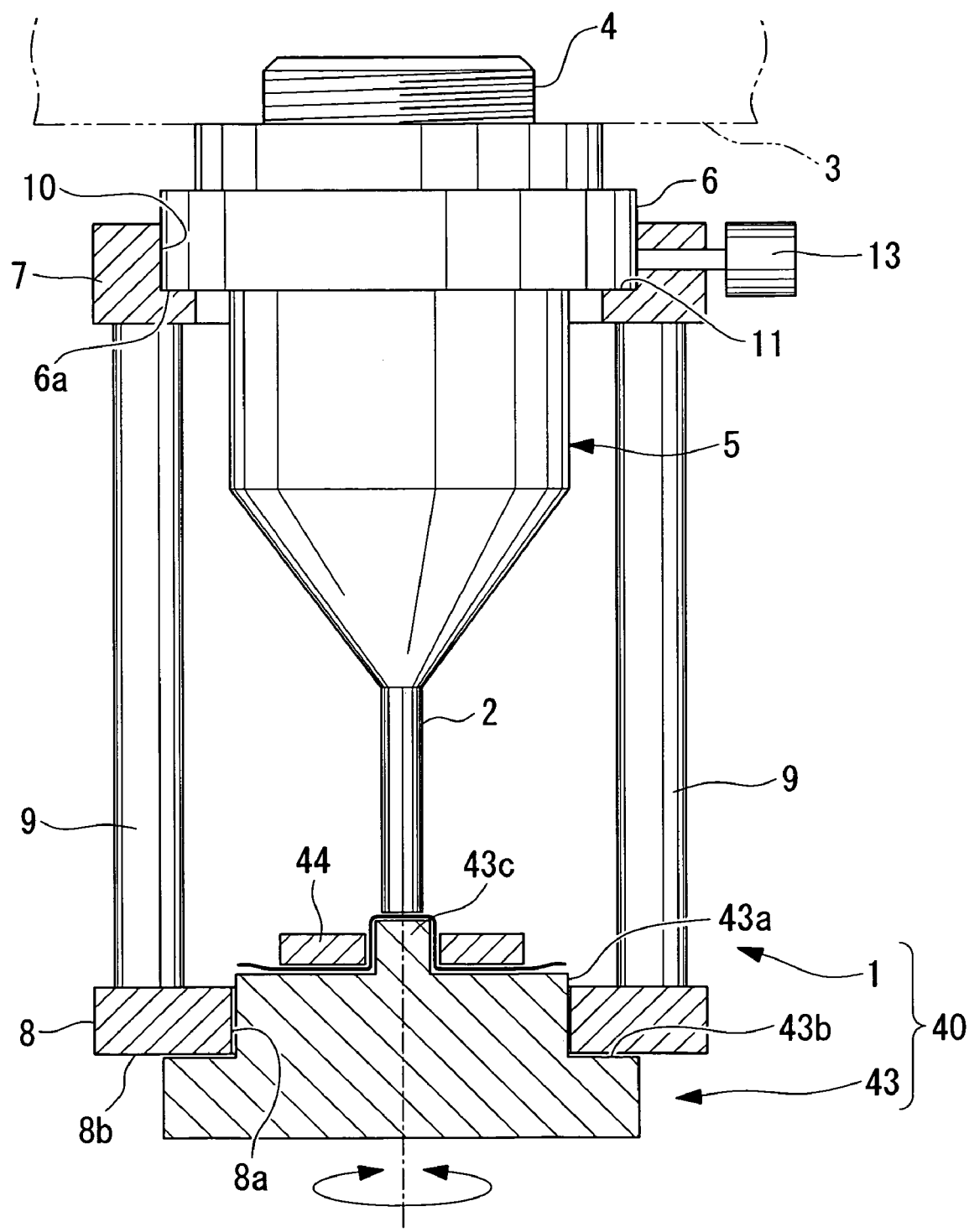
FIG. 18 is a partially cut away longitudinal sectional view of an objective-lens cleaner according to a third embodiment of the present invention, when mounted on an objective lens.
Figure 19:
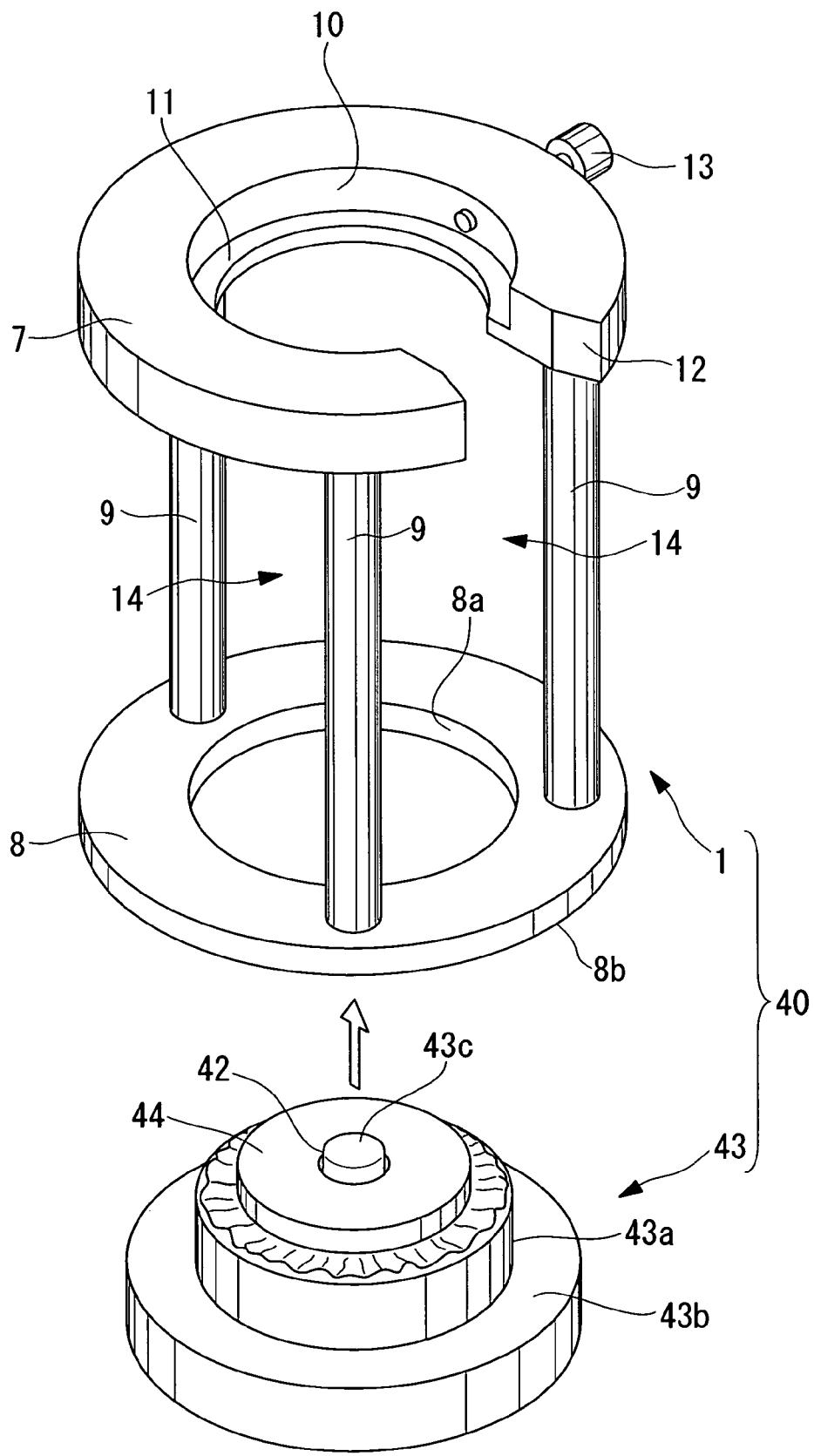
FIG. 19 is a perspective view of the objective-lens cleaner of FIG. 18.

Referring to FIGS. 18 and 19, the objective-lens cleaner 40 according to this embodiment includes an objective-lens protector 1 mounted on an objective lens 5 removed from a microscope main body; and a fitting member 43 having a wiping member 42 which is moved relative to the objective lens 5 using the objective-lens protector 1 as a guide.

Referring to FIG. 19, the above-described objective-lens protector 1 is constructed by linking a substantially ring-shaped mounting portion 7 with a ring-shaped base 8 via three columnar members 9. Referring to FIG. 18, the mounting portion 7 includes a central opening 10 for receiving a large-diameter portion 6 of the above-described objective lens 5; a stepped portion 11 receiving an end surface 6a of the large-diameter portion 6, i.e., the end surface 6a facing the tip of the objective lens 5; a cut-out portion 12 formed by cutting out a portion of the mounting portion 7 in the circumferential direction; and a setscrew 13 provided so as to be retractable in the radial direction. Reference numeral 4 in the figure denotes a threaded mount formed on the objective lens 5 and used to mount the objective lens 5 on a microscope main body 3.

Referring to FIG. 18, the distance between the mounting portion 7 and the base 8 is set such that a small-diameter tip 2 of the objective lens 5 is disposed between the mounting portion 7 and the base 8 when the end surface 6a of the large-diameter portion 6 of the objective lens 5 is in contact with the stepped portion 11. When the objective lens 5 is mounted on the mounting portion 7 such that the end surface 6a of the large-diameter portion 6 is in contact with the stepped portion 11, the center of the objective lens 5 is substantially aligned with in the center of the objective-lens protector 1.

Furthermore, the above-described columnar members 9 are arranged at sufficiently large distances along the radial direction from the objective lens 5 when disposed substantially in the center of the objective-lens protector 1. Because of this, when an operator grips the objective-lens protector 1 from outside, the operator's hand does not touch the outer surface of the objective lens 5 disposed in the central position.

A gap 14 that is large enough to allow the objective lens 5 to be seen or washed from outside is defined between each pair of columnar members 9.

Figure 20:
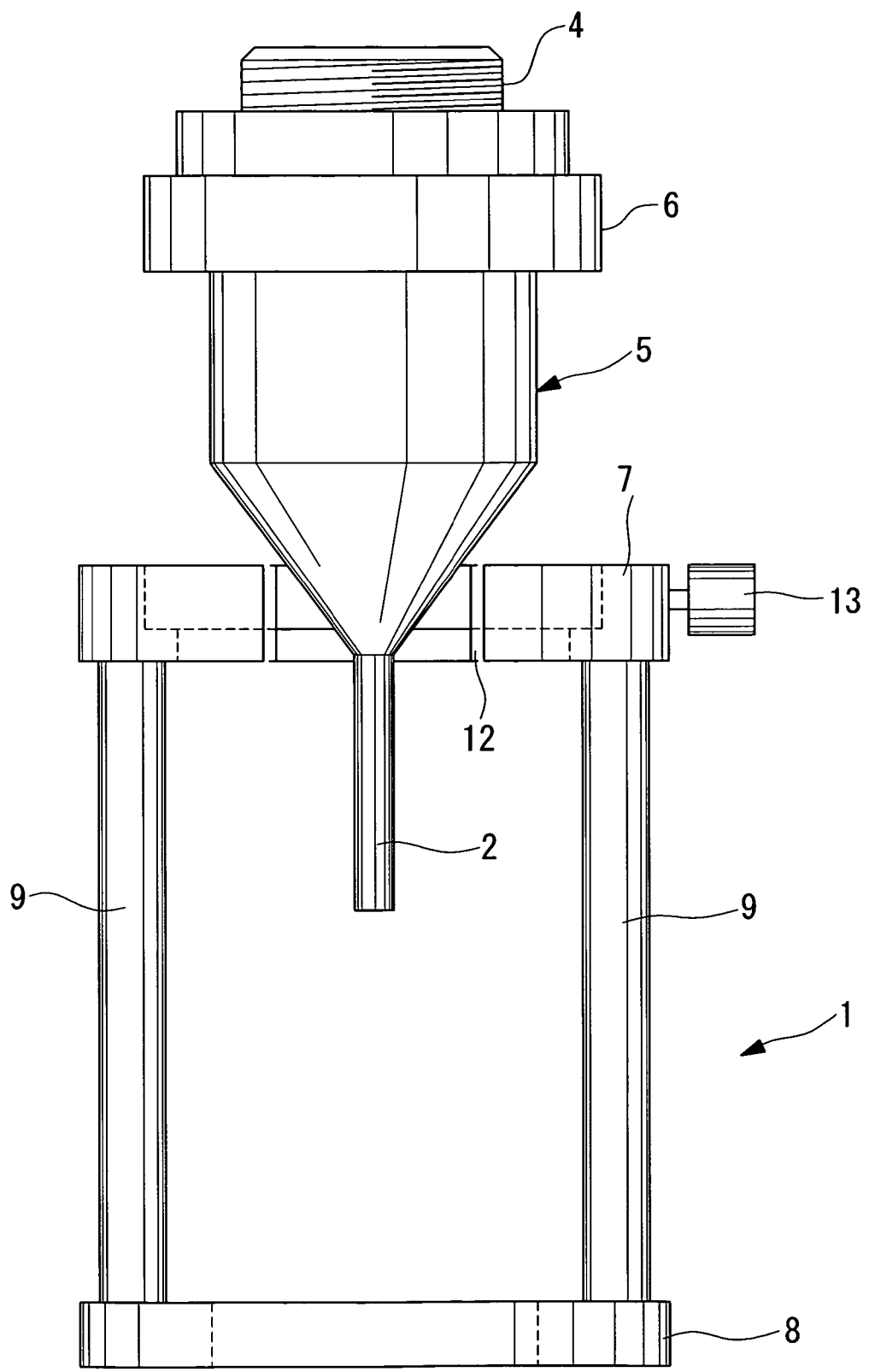
FIG. 20 is a diagram depicting the objective-lens cleaner of FIG. 18 being mounted on an objective lens.

Referring to FIG. 20, the above-described cut-out portion 12 has a width larger than the diameter of the objective lens 5 as measured at a longitudinal midway position of the objective lens 5. Because of this, in order to mount or remove the objective-lens protector 1 onto or from the objective lens 5, it is not necessary to move the objective-lens protector 1 in the optical-axis direction to receive or remove the objective lens 5 by passing the small-diameter tip 2 through the ring of the mounting portion 7. Instead, the objective lens 5 can be moved in the radial direction through the cut-out portion 12 at a longitudinal midway position thereof, as shown in FIG. 20.

When the setscrew 13 is tightened when the end surface 6a of the large-diameter portion 6 is in contact with the stepped portion 11 of the mounting portion 7, the tip of the setscrew 13 presses against the outer circumferential surface of the large-diameter portion 6 inwards in the radial direction. As a result, the objective lens 5 and the objective-lens protector 1 are secured to each other due to the friction between the tip of the setscrew 13 and the outer circumferential surface of the large-diameter portion 6 so that they do not move relative to each other in the circumferential direction or the axial direction.

On the other hand, the ring-shaped base 8 includes, on the inner diameter side thereof, a fitting opening 8a into which the above-described fitting member 43 is fitted and a contact surface 8b against which the fitting member 43 abuts in the axial direction.

The above-described fitting member 43 includes a fitting shaft 43a that is fitted into the fitting opening 8a of the base 8 of the objective-lens protector 1 with a small gap between the fitting shaft 43a and the fitting opening 8a; a stepped portion 43b against which the contact surface 8b abuts; and a wiping shaft 43c positioned to face the end surface of the objective lens 5 with a small gap interposed therebetween when the contact surface 8b abuts against the stepped portion 43b.

Furthermore, the wiping shaft 43c of the fitting member 43 is covered with a wiping member 42, such as Silbon paper, moistened with a disinfectant solution, such as alcohol, and is held at the end of the wiping shaft 43c by a ring-shaped pressing member 44 fitting into the wiping shaft 43c.

As a result, when the fitting member 43 is fitted into the fitting opening 8a of the base 8 of the objective-lens protector 1 and is brought into contact with the contact surface 8b of the base 8, the wiping member 42 covering the end of the wiping shaft 43c is brought into contact with the tip of the objective lens 5.

The operation of the objective-lens cleaner 40 according to this embodiment, with the above-described structure, will be described below.

In order to clean the objective lens 5 using the objective-lens cleaner 40 according to this embodiment, the large-diameter portion 6 of the objective lens 5 is first inserted through the central opening 10 of the mounting portion 7 while the setscrew 13 provided on the mounting portion 7 is retracted sufficiently outwardly in the radial direction, and then the end surface 6a of the large-diameter portion 6 of the objective lens 5 is made to abut against the stepped portion 11 of the mounting portion 7. In this state, the objective lens 5 is positioned substantially in the center of the three columnar members 9, so that the outer surface of the objective lens 5 is prevented from being accidentally touched from the outside, unless an operator deliberately inserts his hand into a gap between the columnar members 9.

Next, when the setscrew 13 is tightened inwards in the radial direction, the tip of the setscrew 13 moves inwards in the radial direction to presses against the outer circumferential surface of the large-diameter portion 6 of the objective lens 5 disposed in the central opening 10. As a result, because of the friction between the tip of the setscrew 13 and the outer circumferential surface of the large-diameter portion 6, the objective lens 5 mounted on the objective-lens protector 1 is secured so as not to rotate in the circumferential direction or come off in the axial direction.

The objective-lens protector 1 according to this embodiment can prevent the small-diameter tip 2 of the objective lens 5 from experiencing an external force by immobilizing the objective lens 5 and can thus protect the tip 2 from damage. Therefore, the objective lens 5 can be protected from an external force while being transported, stored, assembled, etc. by mounting the objective-lens protector 1 on the objective lens 5.

Furthermore, the objective-lens protector 1 allows the objective lens 5 to be handled without requiring an operator to directly touch the objective lens 5. This is advantageous especially if the objective lens 5 is contaminated after it has just been used for examination. Therefore, the operator's hand is protected from contamination on the objective lens 5.

For example, if body fluid, proteins, or the like of a specimen (not shown in the figure) are adhered to the small-diameter tip 2 of the objective lens 5 after microscope examination has been carried out with the objective lens 5 mounted on the microscope main body 3, the objective-lens protector 1 is mounted on the objective lens 5 mounted on the microscope main body 3.

In this case, the objective lens 5 can be attached to the objective-lens protector 1 by moving the objective lens 5 in the radial direction through the cut-out portion 12 of the mounting portion 7 at a longitudinal midway position of the objective lens 5, as shown in FIG. 20. Therefore, the objective-lens protector 1 can be attached to the objective lens 5 even in a situation where a working space no longer than the entire length of the objective-lens protector 1 can be prepared around the objective lens 5 when mounted on the microscope main body 3.

In addition, since the objective lens 5 is secured so as not to move relative to the objective-lens protector 1 due to the effect of the setscrew 13, the operator can easily remove the objective lens 5 from the microscope main body 3 by rotating the objective-lens protector 1 about the optical axis of the objective lens 5.

When the operator handles the objective-lens protector 1 at this time, since he or she does not have to directly touch the surface of the objective lens 5, the operator's hand is protected from contamination on the objective lens 5. Furthermore, since the objective-lens protector 1 having an outer diameter larger than the large-diameter portion 6 of the objective lens 5 is rotated, only a small torque is required to easily remove the objective lens.

Furthermore, the objective-lens protector 1 allows the objective lens 5 to be handled without requiring an operator to directly touch the objective lens 5, as described above. This is also advantageous especially if the objective lens 5 is clean before it is used for examination. In this manner, the clean objective lens 5 is protected from contamination on the operator's hand.

For example, when the objective lens 5 is mounted on the microscope main body 3 after being washed, disinfected, or sterilized, the operator can manipulate the objective-lens protector 1 instead of directly touching the objective lens 5 with his or her hand. Therefore, the outer surface of the objective lens 5, after being sterilized etc., can be protected from contamination on the operator's hand to ensure that the subsequent microscope examination can be carried out with the clean objective lens 5. In addition, when the objective lens 5 is to be mounted on the microscope main body 3, only a small working space is required around the objective lens 5.

In order to clean the end portion of the objective lens 5 in this state, the wiping member 42, such as Silbon paper, moistened with a disinfectant solution is placed over the wiping shaft 43c of the fitting member 43, and the pressing member 44 is fitted with the wiping shaft 43c from above to spread the wiping member 42 over the tip of the wiping shaft 43c. The fitting shaft 43a of the fitting member 43 with the above-described structure is fitted into the fitting opening 8a of the base 8 formed on the objective-lens protector 1 and is then advanced further until the stepped portion 43b of the fitting member 43 comes into contact with the contact surface 8b of the base 8, so that the wiping member 42 abuts against the tip of the objective lens 5 with an appropriate pressing force. In this state, the wiping member 42 is moved relative to the objective lens 5 by rotating the fitting member 43 relative to the objective-lens protector 1 about the axis of the objective lens 5 to allow the tip of the objective lens 5 to be wiped.

Therefore, the operator can clean the tip of the objective lens 5 merely by rotating the fitting member 43 relative to the objective-lens protector 1. In this case, since the stepped portion 43b of the fitting member 43 is in contact with the contact surface 8b of the base 8 of the objective-lens protector 1, the end surface of the objective lens 5 is protected from an extreme force when the operator manipulates the fitting member 43 by hand, thus protecting the objective lens 5 from damage.

After cleaning is completed, the fitting member 43 can be detached from the objective-lens protector 1 and the pressing member 44 can be removed from the wiping shaft 43c to replace the wiping member 42 contaminated with contamination. Therefore, the fitting member 43 and the pressing member 44 can be re-used by replacing the wiping member 42, which is disposable, at appropriate times to continue cleaning other objective lenses 5.

Although Silbon paper moistened with a disinfectant solution serves as the wiping member 42 in this embodiment, another wiping member, such as gauze or tissue paper, may be used instead.

Furthermore, although this embodiment has been described by way of example of the objective-lens protector 1 that is secured to the objective lens 5, another type of objective-lens protector 1 that is secured to the microscope main body 3 having the objective lens 5 mounted thereon may be employed instead.

Figure 22:
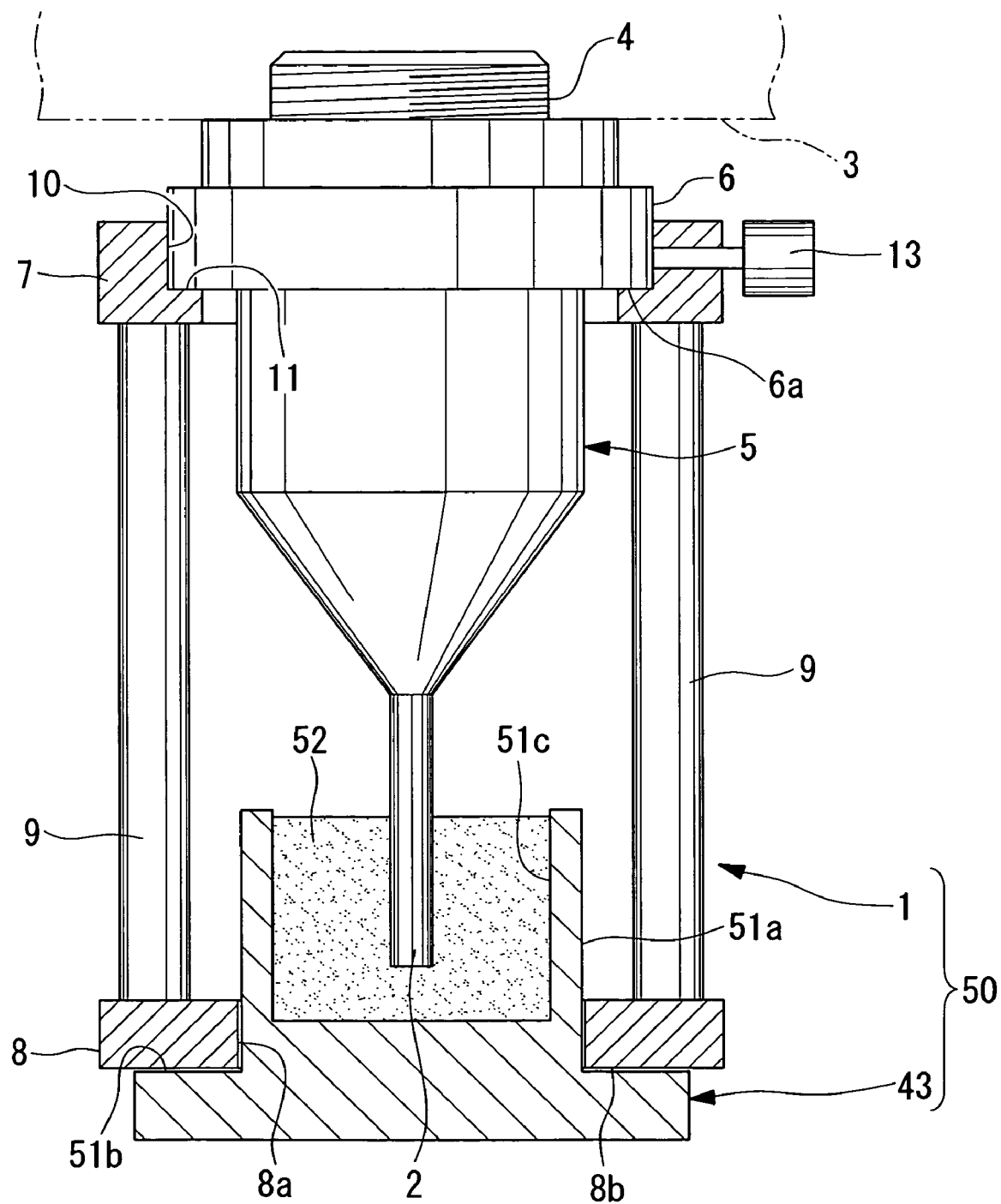
FIG. 22 is a longitudinal sectional view illustrating the process of cleaning an objective lens using the objective-lens cleaner of FIG. 21.
Figure 23:
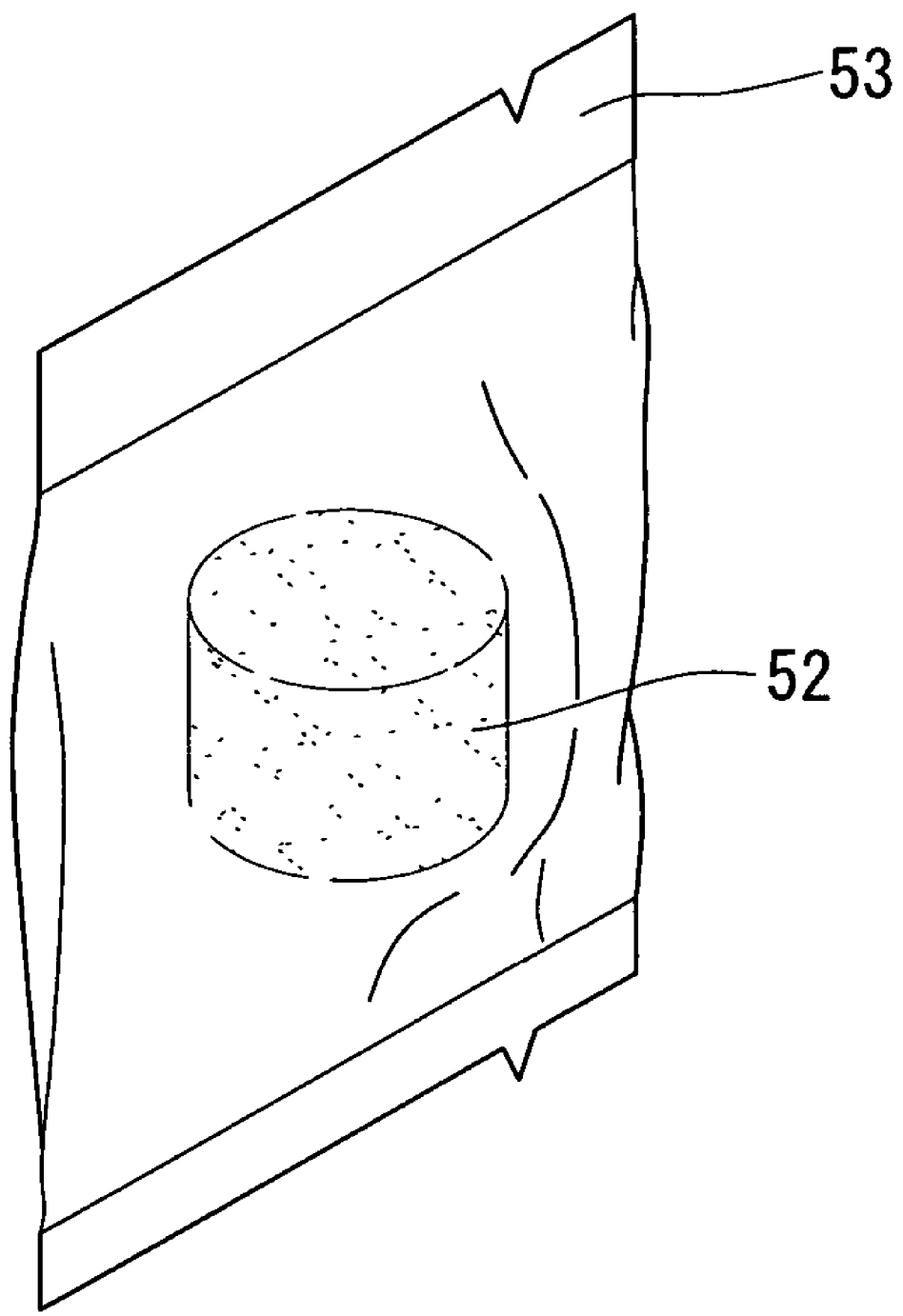
FIG. 23 is a perspective view of one example of a wiping member used with the objective-lens cleaner of FIG. 20.

An objective-lens cleaner 50 according to a fourth embodiment of the present invention will now be described with reference to FIGS. 21 to 23.

In this embodiment, components that are the same as or equivalent to those used in the objective-lens cleaner 40 according to the foregoing third embodiment are denoted by the same reference numerals, and thus a description thereof will be omitted.

Figure 21:
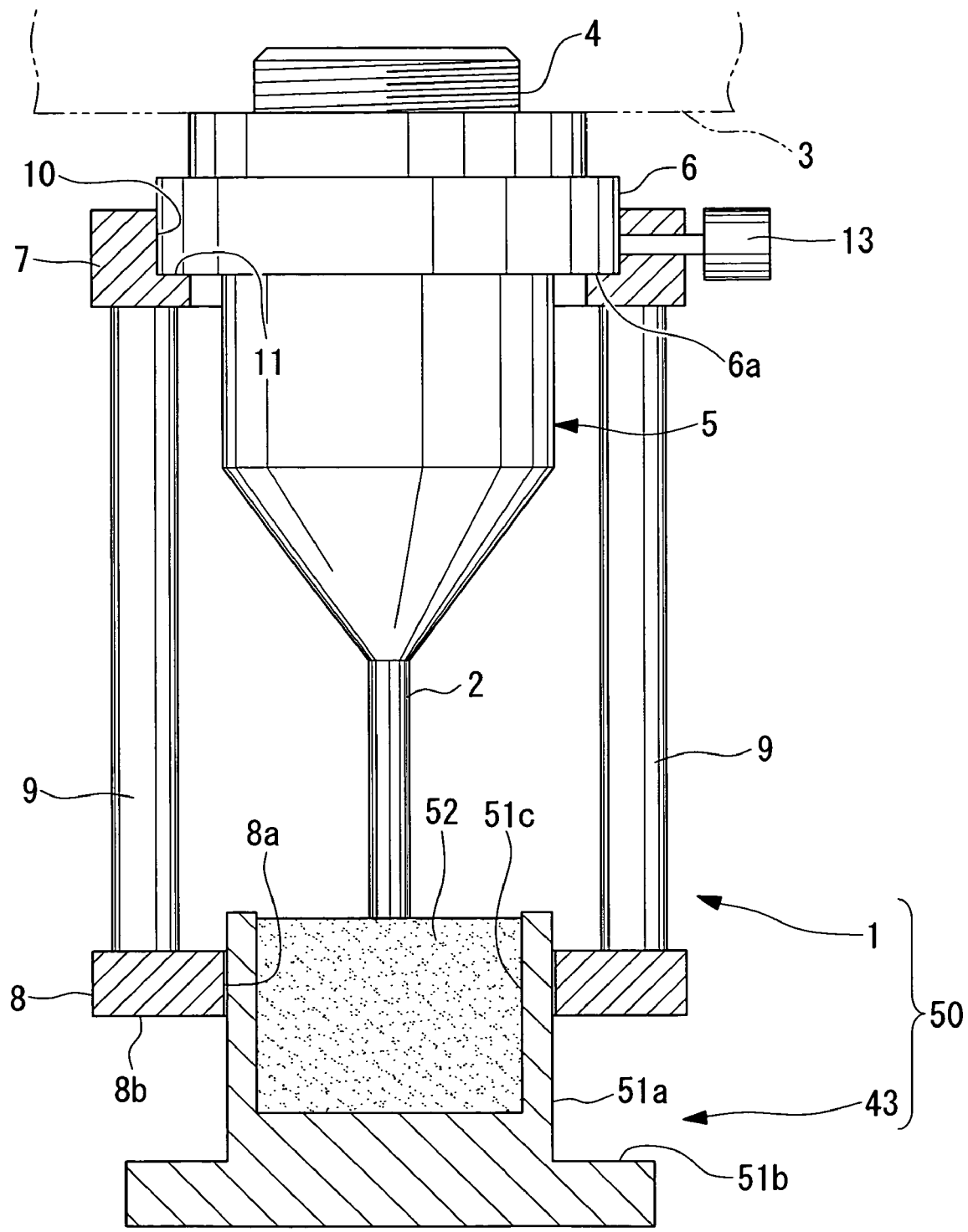
FIG. 21 is a longitudinal sectional view of an objective-lens cleaner according to a fourth embodiment of the present invention.

Referring to FIG. 21, the objective-lens cleaner 50 according to this embodiment differs from the objective-lens cleaner 40 according to the second embodiment with respect to a fitting member 51.

The fitting member 51 includes a fitting shaft 51a that is fitted into a fitting opening 8a of a base 8 of the objective-lens protector 1 with a small gap between the fitting shaft 51a and the fitting opening 8a; and a stepped portion 51b against which a contact surface 8b abuts. The fitting member 51 further includes a storage space 51c for receiving a wiping member 52 made of sponge which faces a small-diameter tip 2 of the objective lens 5 when the fitting shaft 51a is fitted into the fitting opening 8a.

The storage space 51c stores the wiping member 52 moistened with, for example, a disinfectant solution or a cleaning solution to keep the disinfectant solution or cleaning solution from flowing away. Furthermore, the storage space 51c has an opening from which the top surface of the wiping member 52 is exposed when stored therein.

The fitting member 51 is fitted into the fitting opening 8a of the objective-lens protector 1 when the wiping member 52 is stored in the storage space 51c. Then, the fitting member 51 is further advanced until the stepped portion 51b of the fitting member 51 comes into contact with an abutting surface 8b of the objective-lens protector 1. Finally, the small-diameter tip 2 of the objective lens 5 is inserted into the wiping member 52 stored in the storage space 51c, as shown in FIG. 22. As a result, the front end of the small-diameter tip 2 of the objective lens 5 is inserted into the wiping member 52 and is pressed by the wiping member 52 with a predetermined contact pressure.

According to the objective-lens cleaner 50 of this embodiment, with the above-described structure, the fitting shaft 51a of the fitting member 51 is fitted into the fitting opening 8a of the objective-lens protector 1 on which the objective lens 5 is mounted, and then the fitting member 51 is further advanced. As a result, the small-diameter tip 2 can be inserted into the wiping member 52 stored in the storage space 51c of the fitting member 51. Thereafter, in this state, the wiping member 52 can clean the entire outer surface of the small-diameter tip 2 of the objective lens 5 by rotating the fitting member 51 relative to the objective-lens protector 1 about the axis of the objective lens 5.

In this case, since the small-diameter tip 2 of the objective lens 5 is inserted into the wiping member 52 when the fitting shaft 51a is engaged with the fitting opening 8a, the objective lens 5 is moved parallel to the axial direction of the objective lens 5 when the small-diameter tip 2 is inserted into the wiping member 52. Therefore, the objective lens 5 is not subjected to an external force at an angle to the axial direction when the small-diameter tip 2 is inserted into the wiping member 52.

Furthermore, when the outer surface of the objective lens 5 is cleaned, since the fitting member 51 is rotated relative to the objective-lens protector 1 with the fitting shaft 51a being engaged with the fitting opening 8a thereof, misalignment of the axis of the fitting member 51 with the axis of the small-diameter tip 2 of the objective lens 5 does not occur during relative rotation of the fitting member 51, and therefore, the small-diameter tip 2 is not subjected to an external force in a direction at an angle to the axial direction. Therefore, there is no danger of the objective lens 5 being damaged by an external force.

Furthermore, since the wiping member 52 is pressed by the entire outer surface of the small-diameter tip 2 of the objective lens 5, contamination on the outer surface of the objective lens 5 can easily be wiped off when the objective lens 5 is cleaned merely by rotating the fitting member 51 relative to the objective-lens protector 1.

In this embodiment, the wiping member 52 stored in the storage space 51c of the fitting member 51 may be realized by a disposable member. More specifically, sponge moistened with a disinfectant solution or cleaning solution may be stored in a bag 53, as shown in FIG. 23.

What is claimed is:

1. An objective-lens protector comprising:
   a substantially ring-shaped mounting portion surrounding a circumference of an objective lens, the mounting portion being detachably mounted on the objective lens such that a threaded mount formed on the objective lens for mounting the objective lens to a microscope main body is exposed;
   a protecting member fixed to the mounting portion, extending substantially along the entire length of the objective lens mounted on the mounting portion, and arranged at a distance outwardly in a radial direction of the objective lens so as to surround the objective lens; and
   a locking mechanism provided on the mounting portion to prevent the objective lens from moving relative to the mounting portion in a circumferential direction.

2. The objective-lens protector according to claim 1, wherein the mounting portion includes a cut-out portion that allows the objective lens to pass therethrough in a radial direction.

3. The objective-lens protector according to claim 1, wherein the protecting member includes a through-hole extending in a radial direction.

4. The objective-lens protector according to claim 1, further comprising:
   a cap screwed onto the threaded mount of the objective lens; and
   a sealing member configured to seal a gap between the cap and the objective lens around the entire circumference of the gap.

5. The objective-lens protector according to claim 4, wherein the mounting portion detachably secures the objective lens via the cap screwed onto the threaded mount of the objective lens.

6. The objective-lens protector according to claim 4, further comprising:
   a first mounting portion on which the objective lens is directly mounted; and
   a second mounting portion on which the objective lens is mounted via the cap.

7. An objective-lens treatment method comprising the steps of:
   mounting the objective-lens protector according to claim 1 on an objective lens mounted on a microscope main body;
   manipulating the objective-lens, protector to remove the objective lens from the microscope main body;
   screwing a cap onto the threaded mount of the objective lens with a sealing member interposed between the cap and the objective lens to seal the entire circumference of the objective lens; and
   immersing an assembly composed of the objective lens, the cap, and the objective-lens protector, which are secured to one another, in a liquid disinfectant to disinfect or sterilize the assembly.

8. The objective-lens treatment method according to claim 7, further comprising the steps of:
   removing the. objective lens having the cap thereon from the objective-lens protector; and
   re-mounting the objective-lens protector on the cap screwed onto the objective lens to re-assemble the assembly, before the assembly is disinfected or sterilized.

* * * * *